United States Patent
Baek et al.

(10) Patent No.: US 11,526,533 B2
(45) Date of Patent: Dec. 13, 2022

(54) VERSION HISTORY MANAGEMENT

(71) Applicant: Dropbox, Inc., San Francisco, CA (US)

(72) Inventors: Jongmin Baek, Saratoga, CA (US); Daniel Wagner, New York, NY (US); Yuyang Guo, Mountain View, CA (US); Kimberly Watkins, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 304 days.

(21) Appl. No.: 15/396,191

(22) Filed: Dec. 30, 2016

(65) Prior Publication Data

US 2018/0189369 A1 Jul. 5, 2018

(51) Int. Cl.
*G06F 16/27* (2019.01)
*G06F 16/21* (2019.01)
*G06F 16/23* (2019.01)

(52) U.S. Cl.
CPC ............ *G06F 16/27* (2019.01); *G06F 16/219* (2019.01); *G06F 16/2358* (2019.01)

(58) Field of Classification Search
CPC ......... G06F 17/30575; G06F 17/30309; G06F 17/30368; G06F 16/27; G06F 16/219; G06F 16/2358
See application file for complete search history.

(56) References Cited

U.S. PATENT DOCUMENTS

| | | | |
|---|---|---|---|
| 8,290,962 B1* | 10/2012 | Chu | G06F 16/319 707/749 |
| 8,874,525 B2 | 10/2014 | Grossman et al. | |
| 9,075,777 B1* | 7/2015 | Pope | G06F 16/9566 |
| 9,135,228 B2 | 9/2015 | Jakobson et al. | |
| 2004/0172425 A1* | 9/2004 | Edelstein | G06F 8/71 |
| 2005/0138540 A1* | 6/2005 | Baltus | G06F 17/2211 715/229 |
| 2007/0016650 A1* | 1/2007 | Gilbert | G09B 5/00 709/207 |
| 2008/0091741 A1* | 4/2008 | Zohar | G06F 11/1092 |
| 2008/0091742 A1* | 4/2008 | Marshall | G06F 16/29 |
| 2008/0168151 A1* | 7/2008 | Fuchs | G06Q 10/10 709/208 |
| 2009/0157811 A1* | 6/2009 | Bailor | G06F 21/31 709/204 |
| 2010/0106685 A1* | 4/2010 | Ott | G06F 16/1787 707/611 |

(Continued)

*Primary Examiner* — Hosain T Alam
*Assistant Examiner* — Anthony G Gemignani
(74) *Attorney, Agent, or Firm* — Polsinelli PC

(57) ABSTRACT

A first client device associated with a first account of a content management system can receive a first or latest version of a synchronized content item. The first client device can determine differences or the "diff" between the first version and a second or next-to-latest version of the content item and upload the first version and the diff to the content management system. Upon receiving the first version and the diff, the content management system can store the first version and the diff and download them to the second client device. The second client device can generate a notification when the download finishes and present the notification with an interface element for requesting presentation of the diff. When the second client device detects a selection of the interface element, the second client device can present the diff.

24 Claims, 11 Drawing Sheets

(56) References Cited

U.S. PATENT DOCUMENTS

| | | | |
|---|---|---|---|
| 2010/0235403 A1 | 9/2010 | Ney de Souza et al. | |
| 2012/0233554 A1* | 9/2012 | Vagell | G06F 16/176 |
| | | | 715/751 |
| 2013/0018873 A1* | 1/2013 | Velasco | G06F 16/48 |
| | | | 707/723 |
| 2014/0033068 A1 | 1/2014 | Gupta et al. | |
| 2014/0101310 A1 | 4/2014 | Savage et al. | |
| 2014/0188919 A1* | 7/2014 | Huffman | G06F 16/951 |
| | | | 707/758 |
| 2014/0289645 A1* | 9/2014 | Megiddo | G06F 3/048 |
| | | | 715/753 |
| 2014/0337482 A1* | 11/2014 | Houston | H04L 67/06 |
| | | | 709/219 |
| 2014/0351434 A1* | 11/2014 | Kim | H04M 1/72533 |
| | | | 709/225 |
| 2014/0351697 A1* | 11/2014 | Robert | G06F 17/30126 |
| | | | 715/273 |
| 2015/0095822 A1* | 4/2015 | Feis | G10G 1/00 |
| | | | 715/765 |
| 2015/0237090 A1* | 8/2015 | Baccichet | H04L 65/602 |
| | | | 709/219 |
| 2016/0070717 A1* | 3/2016 | Bergner | G06F 16/178 |
| | | | 707/638 |
| 2016/0182088 A1* | 6/2016 | Sipos | G06F 3/064 |
| | | | 714/764 |
| 2016/0224548 A1* | 8/2016 | Massand | G06F 16/93 |

\* cited by examiner

VERSION HISTORY MANAGEMENT

TECHNICAL FIELD

The present technology pertains to version history management, and more specifically pertains to managing version histories of synchronized content items.

BACKGROUND

Synchronization can help an individual user to maintain consistency of content items across all of her devices. However, there are differences between synchronization for a single user's content and synchronization of content among multiple users. For example, the individual user generally knows what changes she made to a content item and why she made those changes from one version to the next but not so when other users have made changes to the content item. An exhaustive version history exacerbates this challenge when the user is only interested in certain types of changes. As another example, an individual user does not typically have individual content open simultaneously on multiple devices but multiple users expect to have concurrent access to a synchronized content item and to be able to concurrently edit the content item in some cases. This means that one user can save a first version (e.g., the latest version) of a synchronized content item while another user has unsaved changes to a second version (e.g., the next-to-latest version). Difficulties can arise for the second user when she attempts to save her version of the synchronized content item (i.e., the second or next-to-latest version in addition to any changes made by the second user), especially if her changes conflict with the first user's changes.

SUMMARY

Disclosed are systems, methods, and non-transitory computer-readable storage media for managing a version history of a synchronized content item. In one implementation, a first client device associated with a first account of a content management system can receive a first version (i.e., the latest version) of the content item. The first client device can determine differences or a "diff" between the first version and a second version (e.g., the next-to-latest version) of the synchronized content item and upload the first version and the diff to the content management system. Upon receiving the first version and the diff, the content management system may store the first version and the diff and ping a second client device to determine whether the second client device can receive the first version. If so, the content manage system can download the first version and the diff to the second client device. The second client device can generate a notification when the download finishes and present the notification with an interface element for requesting presentation of the diff. When the second client device detects a selection of the interface element, the second client device can present the diff.

DESCRIPTION

Figure 1:
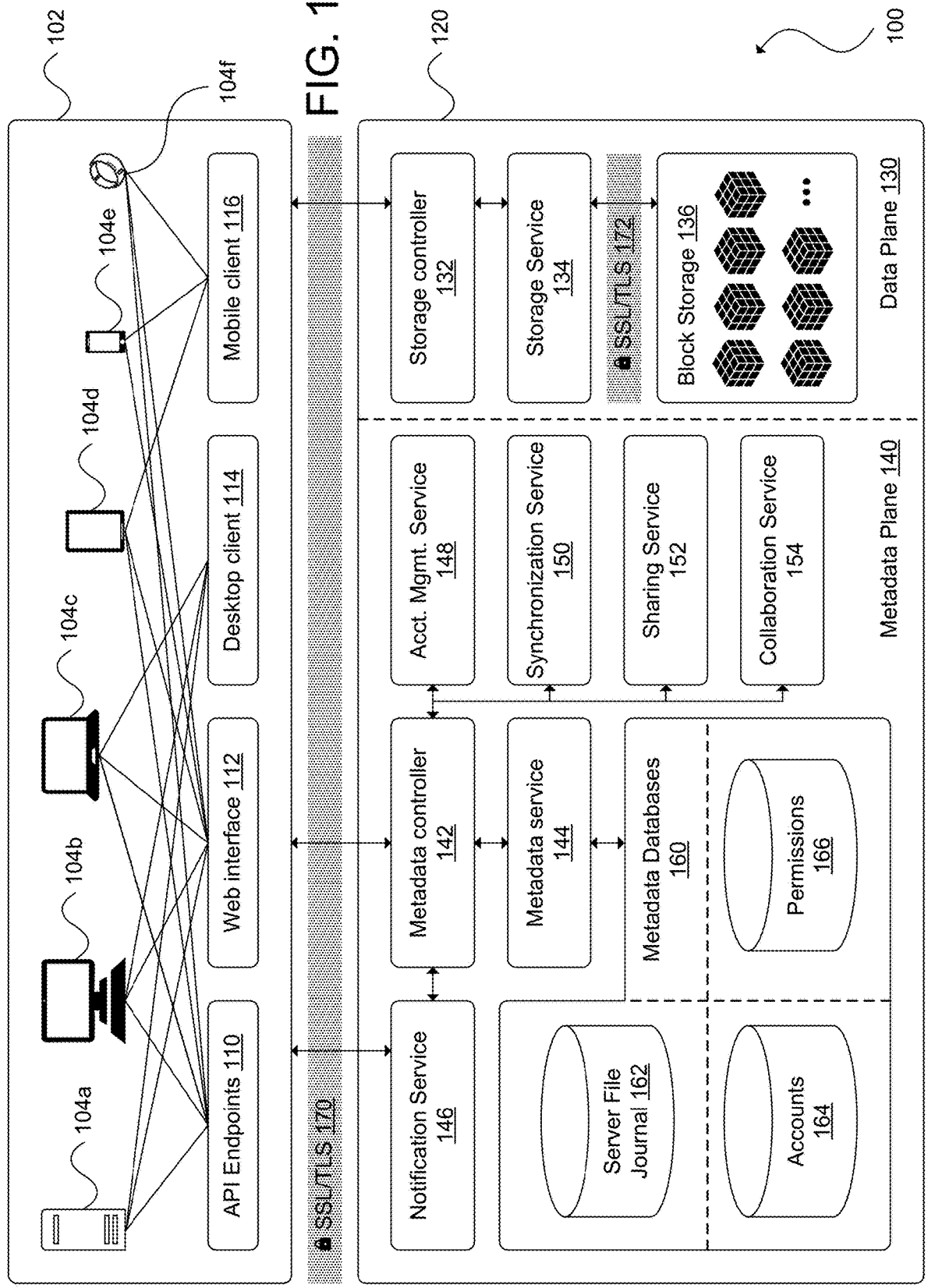
FIG. 1 shows an example of a content management system for implementing aspects of the present technology.

The present technology addresses the need in the art for managing the version history of a shared, synchronized content item. Conventional content management systems too often treat the version history of a content item as an afterthought but this may be the only information available to understand changes between and among multiple versions of the content item, particularly if the content item is shared among multiple accounts. Some conventional content management systems fail to provide an account user with any kind of indication of updates to a synchronized content item; the account user only becomes aware of changes by viewing the content item's metadata (e.g., a timestamp) or the content item itself. If a conventional content management system does provide any information regarding the availability of a first version (i.e., the latest version) of the synchronized content item, the information is oftentimes de minimis (e.g., a notification indicating only an update to the synchronized content item). Various implementations of the present technology provide users with more contextual information regarding a first or latest version of a synchronized content item, such as the identity of a specific user or group account saving changes to the content item, content item metadata (e.g., file name, file path, file size, modification date, etc.) (whether updated or not), a descriptive summary of the changes, the changes themselves (e.g., a "diff" or a comparison between the first version and a second or next-to-latest version), etc.

Typical versioning systems are only capable of providing a description of changes at a very low level of detail, such as a number of insertions, deletions, moves, and formatting changes or a list of unchanged lines, deleted lines, and inserted lines. In various implementations of the present technology, a content management system can extract the differences between multiple versions of a content item and classify the nature of the changes at a higher level of abstraction that is more intuitive for account users to understand. For example, the content management system can classify changes as a "major" revision, "minor" revision, and/or other suitable categorization; a determined number of sentences, paragraphs, pages, chapters, sections, cells, rows, columns, tables, sheets, slides, and/or other segment of a content item added, deleted, modified, relocated, reformatted, and/or otherwise updated; an updated named segment (e.g., the introduction, chapter 2, section IV, the representations and warranties, the claims, sheet no. 5, the sixth slide, the (email) signature, etc.), among other classifications. The content management system can present the determined classification to other account users to give them greater context concerning the first or latest version, such as within a notification and/or as a comment regarding the first version. For example, the content management system can automatically append the classification as the initial comment for the first version or provide the classification as a default comment that the content item editor can revise and submit as the initial comment.

Some conventional content management systems also fail to provide adequate versioning tools so that account users may better manage different versions of synchronized content items. Users of these conventional systems must instead rely on native content viewers or editors (i.e., applications associated with a specific file type, such as specific document readers or word processors for certain types of digital documents, specific spreadsheet applications for certain types of digital spreadsheets, specific presentation applications for certain types of digital presentations, etc.) and/or third party applications to perform various version history management tasks. This can be time-consuming and onerous for these users. For example, to determine the differences between different versions of a synchronized content item, the user of a conventional content management system may have to download each version of the content item (if available), rename at least one version or move at least one version to a separate path, translate at least one version to a common format depending on differences between the operating systems and/or applications utilized by the user and the editor(s) of the content item, and operate the native and/or third-party application(s) to generate the "diff" or comparison of the multiple versions.

In various implementations of the present technology, a content management system can streamline version history management by building into client interfaces tools for generating comparisons between multiple versions of synchronized content items, merging multiple sets of changes to the content items, acquiring statistical information regarding version histories of the content items (e.g., number of versions, number of editors, number of specific types of edits, average time between edits, average number of edits per editor, average and/or total number of edits over specified periods of time, maximum text added in a version, maximum text deleted in a version, etc.), among other version history management tasks. In some implementations, these tools may be immediately accessible from a notification regarding updates to a synchronized content item (in addition to being accessible in other locations). In some implementations, the content management system may provide these tools via a non-native content viewer or editor (i.e., the content viewer or editor is part of a web interface of the content management system or is otherwise a distinct component of a client interface of the content management system rather than a plug-in, library, driver, etc. of a native application). This may be especially suitable for cross-platform account users of a synchronized content item and/or for an account user who cannot run or would prefer not to run a native content viewer or editor on her device. In addition or alternatively, the content management system may integrate these version history management tools with a native application for the content item.

While many conventional content management systems leave users wanting from a deficit of version history information, some conventional content management systems provide an excess of version history information without providing users with tools to understand what can often be a substantial amount of data. For example, the conventional systems may provide their users with access to hundreds, thousands, or an even greater number of versions of a synchronized content item, and their users must fend for themselves to make sense of this voluminous data. In various implementations of the present technology, a content management system can provide sorting, filtering, and/or other analytical tools to enable an account user to surface versions of a synchronized content item most pertinent to her. For example, the content management system may support sorting and/or filtering on the basis of a version's metadata (e.g., modification date, content item name and/or other identifier, editor, editor's geographic location, editor's network location, editor's host type, editor's host operating system, editor's client application type, file size, a difference in size between the version and a previous version, etc.). In addition, the content management system may enable quantitative filtering, such as to include and/or exclude versions having at least, no more than, and/or exactly a specified number of edits, types of edits (e.g., insertions, deletions, modifications, relocations, formatting, etc.), updated segments (e.g., sentences, paragraphs, pages, etc.), views without edits, etc. The content management system may also support keyword search and/or filtering on the basis of a version's content, comments, edit categorization (e.g., major, minor, etc.), updated named segment(s) (e.g., title, abstract, history, see also, references, etc.), among other criteria. The content management system can also generate a diff or comparison between and among any other number of versions of a synchronized content item. For example, the content management system may receive a request to produce a diff from three or more specified versions of the content item and return a single comparison color-coding or otherwise differentiating differences among the three or more versions. Disclosed below are additional functions and advantages of the present technology.

Various implementations deploy the present technology as part of a content management system that may have capabilities such as secure access and storage of content items, synchronization of the content items between and among multiple client devices in real-time or substantially real-time, collaborative creation and editing of content items, version history management, among others. Content items can be any coherent digital data, such as documents, text files, audio files, images, videos, webpages, executable files, binary files, etc. A content item can also include collections or other groupings of content items, such as folders, directories, drives, zip files, playlists, albums, etc.

FIG. 1 shows an example of content management system 100, which can include client tier 102 and server tier 120. One skilled in the art will understand that FIG. 1 (and generally any system or system element discussed in the present disclosure) is but one example of a content management system and that other implementations can include additional, fewer, or alternative components arranged in similar or alternative orders, or in parallel, unless otherwise stated. Content management system 100 is generally platform-agnostic, and thus client tier 102 can generally include any client device capable of communicating over a network (e.g., a local area network (LAN) or a wide area network (WAN) like the Internet), such as client devices 104a, 104b, ... (individually, 104n; collectively, 104) as examples, and any number of interfaces (e.g., graphical user interfaces, web interfaces, touchscreens, gesture interfaces, natural language interfaces, application programming interfaces (APIs), command line interfaces, combinations of these interfaces, etc.) for client devices 104 to interact with server tier 120, such as interfaces 110, 112, 114, and 116 as examples.

Server tier 120 can include data plane 130 for functionality generally related to block storage 136 and metadata plane 140 for functionality generally related to metadata databases 160. Each plane can include a controller, storage controller 132 for data plane 130 and metadata controller 142 for metadata plane 140. One of ordinary skill in the art will understand that partitioning content management system 100 in this example into client tier 102 and server tier 120, and server tier 120 into data plane 130 and metadata plane 140 is arbitrary for ease of reference. For instance, one of ordinary skill in the art may also characterize content management system 100 as an example of a three-tier or multi-tier architecture in which the client interfaces of client tier 102 form a presentation tier; storage controller 132 and components between storage controller 132 and block storage 136, and metadata controller 142 and components between metadata controller 142 and metadata databases 160 form an application or logic tier, and block storage 136 and metadata databases 160 form a data tier. Numerous other classifications are also possible. For instance, one skilled in the art may also categorize content management system 100 as an example of a model-view-controller architecture with data plane 130 as the model, client tier 102 as the viewer, and metadata plane 140 as the controller. As another example, a skilled artisan may consider content management system 100 to be a type of multi-tenant "cloud" or network architecture in which each tenant (e.g., a user or a group of users) has access to her own secure and exclusive virtual computing environment (e.g., an account) within content management system 100 to perform operations relating to the tenant's content items. As yet another example, a person having ordinary skill in the art may describe certain aspects or features of content management system 100 as a type of peer-to-peer architecture. For instance, in various implementations, content management system 100 provides a feature referred to as local area network (LAN) synchronization in which clients devices initiate download of a content item by detecting whether a copy exists on the LAN before retrieving the content item from a remote data source.

Content Storage

A feature of content management system 100 is the secure management and storage of content items. In the example of FIG. 1, content management system 100 can include data plane 130 for managing and storing a content item's "actual" data (i.e., digital information making up the content item) and metadata plane 140 for controlling and storing the content item's metadata (i.e., digital information describing a content item, such as the content item's name, path, size, date of creation, date of last modification, etc., and/or digital information describing entities associated with the content item, such as the author(s), editor(s), shared user(s), group(s), account(s), etc.) in metadata plane 140. Data plane 130 and metadata plane may include several security layers, such as security layers 170 and 172, in between client tier 102 and block storage 136 and metadata in metadata databases 160. For example, content management system 100 may protect data flowing between client tier 102 and server tier 120 and between storage service 134 and block storage 136 using a tunneling protocol, such as Secure Sockets Layer (SSL)/Transport Layer Security (TLS) as one example, to create secure tunnels protected by a suitable method of encryption, such as 128-bit or higher Advanced Encryption Standard (AES) encryption as one example.

In the example of FIG. 1, storage service 134 can process each content item received to storage controller 132 by splitting each into blocks or other suitable data structure or representation (e.g., file, object, binary large object (BLOB), etc.); encrypting each block using a strong cipher (e.g., Secure Hash Algorithm (SHA) 256 in some implementations); and synchronizing modified blocks between revisions. When content management system 100 detects a new content item or changes to an existing content item, content management system 100 may notify (e.g., via notification service 146) storage controller 132 of the change, and storage service 134 can process the new or modified blocks and transfer them to block storage 136. In some implementations, storage service 134 can operate as a content-addressable storage (CAS) system, with each individual encrypted filed block retrieved based on its hash value.

Metadata plane 140 can include various types of metadata in metadata databases 160, which in this example includes server file journal 162, accounts database 164, and permissions database 166. Client tier 102 and the services of content management system 100 can access metadata databases 160 via metadata controller 142 and/or metadata service 144. In some implementations, content management system 100 can store metadata in a MySQL-backed database service, which content management system 100 may shard and replicate to meet performance and high availability requirements. Although content management system 100 utilizes SQL-based databases in this example, one of ordinary skill in the art will understand that other implementations may additionally or alternatively utilize object storage, file storage, key-value or NoSQL databases, relational databases, combinations of these types of storage, etc.

Metadata service 144 can identify and store metadata describing a content item, changes to the content item, access to the content item, interactions (e.g., a number of views, a number of edits, etc.) with the content item, content item types, content path, and/or the relationship of the content item to various accounts, collections, or groups in metadata databases 160, in association with a unique identifier of each content item. For example, metadata service 144 can record the location of each block making up a content item (i.e., a block list) in server file journal 162. Thus, server file journal 162 can include an entry for each content item stored in block storage 136, and metadata service 144 can locate a content item by its unique identifier in server file journal 162.

In some implementations, a deterministic hash function can determine the unique identifier. This method of deriving a unique identifier for a content item can recognize content item duplicates since the deterministic hash function will generally output the same identifier for every copy of the same content item, but will generally output a different identifier for a different content item. Using this methodology, content management system 100 can generally output a unique identifier for each content item.

In some implementations, metadata service 144 can also designate or record a content path for a content item. The content path can include the name of the content item and/or folder hierarchy associated with the content item. For example, the content path can include a folder or path of folders in which the content item is stored in a local file system on a client device. Metadata service 144 can use the content path to present the content items in the appropriate folder hierarchy, such as a tree-like directory structure.

In addition to a content path and content pointer, metadata service 144 can store an account identifier for each entry of server file journal 162 that identifies the account or accounts that have access to the content item and/or a group identifier that identifies a group with access to the content item. In some implementations, metadata service 144 can associate multiple account identifiers with a single content item indicating that the content item has shared access between and among the multiple accounts. In addition or alternatively, account identifiers associated with a single content entry can specify different permissions for a content item, which metadata service 144 can maintain in permissions database 166 as discussed in greater detail elsewhere in the present disclosure.

In some implementations, storage service 134 and/or metadata service 144 can decrease the amount of storage space used by block storage 136 by identifying duplicate content items or duplicate blocks that make up a content item or versions of a content item. Instead of storing multiple copies, block storage 136 can store a single copy of the content item or a single block of the content item and server file journal 162 can include a pointer or other mechanism to link the duplicates to the single copy.

In some implementations, metadata service 144 can also store a log of data regarding interactions with content items (e.g., a change to a content item, access to the content item, accounts accessing the content item, etc.) in metadata databases 160. For example, server file journal 162 can include the unique identifier of the content item and a description of the change or access action along with a time stamp or version number and any other relevant data. Server file journal 162 can also include pointers to blocks affected by the change or content item access.

In some implementations, metadata service 144 can provide the ability to undo operations, by using content item version control tools that track changes to content items, different versions of content items (including diverging version trees), and a change history that can be acquired from server file journal 162. The change history can include a set of changes that, when applied to the original content item version, produces the changed content item version.

Each of the various storage and/or databases of content management system 100 can comprise more than one storage and/or database instance. In some implementations, content management system 100 can distribute the multiple storage or database instances over many computing devices and locations. In some implementations, content management system 100 can combine data from metadata databases 160 and block storage 136 into one or more storage or database instances or further segment them into additional storage or databases. Thus, content management system 100 may include more or less storage and/or databases than shown in FIG. 1.

Accounts

Notification service 146 can monitor accounts of content management system 100 for changes to each account's collection of content. In some implementations, a client device 104*n* can establish a long poll connection to notification service 146 and wait for a response. When a change to the content items of the account associated with client device 104*n* occurs, notification service 146 can signal a change to client device 104*n* by closing the long poll connection. This can signal to client device 104*n* to connect to metadata service 144 to synchronize any changes.

In some implementations, content management system 100 may utilize namespaces to distinguish accounts. A namespace can represent a root directory of a traditional file system directory tree. Content management system 100 may associate each account with a root namespace. In addition, every shared folder can be a namespace which content management system 100 can mount within one or many root namespaces. Using such an approach, content management system 100 may be able to uniquely identify every file and directory uniquely by two values—a namespace and a relative path within the namespace. In some implementations, server file journal 162 can store a namespace identifier and namespace relative path for each content item. As discussed, server file journal 162 can store data regarding access to each content item, changes to each content item, etc. In some implementations, server file journal may be "append-only" in which each row can represent an immutable version of a file.

In some implementations, content management system 100 can store content items in association with accounts. An entity (e.g., an individual user, a group of users, a corporation or other collection of entities, etc.) can create an account with content management system 100 via account management service 148. Account management service 148 (and other services of content management system 100) can store account details in accounts database 164, which can include profile information for registered entities. Profile information for a registered entity can include a username and/or email address. Accounts database 164 can also store account management information, such as account type (e.g., various tiers of free or paid accounts), storage space allocated, storage space used, client devices associated with an account, security settings, and personal configuration settings, etc.

In some implementations, accounts database 164 can also store groups of accounts associated with an entity (e.g., user, group of users, organization, corporation, etc.). Groups can have permissions based on group policies and/or access control lists, and members of a group can inherit the permissions. For example, a marketing group can have access to one set of content items while an engineering group can have access to another set of content items. An administrator of a group can modify groups, modify user accounts, etc. In the example of FIG. 1, content management system 100 can store permissions and/or access control lists within permissions database 166 in physical and/or logical isolation from accounts database 164.

Synchronization

Another feature of content management system 100 is synchronization of content items, such as managed by synchronization service 150. Content management system 100 can support various types of synchronization, such as delta synchronization, streaming synchronization, local area network (LAN) synchronization, and selective synchronization, among other approaches. Delta synchronization involves identifying modified portions of content items (e.g., delta blocks) and downloading/uploading only those portions for synchronizing the content items instead of transferring entire content items every time they change. In streaming synchronization, instead of waiting for a content item upload from a first client device to complete, content management system 100 may begin downloading the content item to a second client device before the content item has finished uploading from the first client device. LAN synchronization attempts to download content items from other client devices on the same LAN before downloading the content item from a remote server.

Selective synchronization enables an account to specify the content items to synchronize on a particular client device. For example, content management system 100 may store a canonical collection of an account's content items (e.g., within block storage 136 and metadata databases 160), and a user of the account can pick and choose portions of the collection to synchronize on a particular client device. Selective synchronization can preserve space on client device 104*n* and improve performance of client device 104*n* and content management system 100 by reducing the processing, memory, storage, and network resources that a conventional content management system and/or client device would otherwise consume by synchronizing all content.

Content management system 100 can synchronize content items from server tier 120 to client tier 102, and vice versa. In implementations in which client tier 102 initiates synchronization, a user of an account can manipulate content items directly from a file system of client device 104n while a client application monitors client device 104 for read, write, copy, move, delete, and other relevant commands to synchronize the changes to server tier 120.

When synchronizing content from server tier 120 to client tier 102, a modification, addition, deletion, and/or move of a content item recorded in server file journal 162 can trigger delivery of a notification to client device 104n using notification service 146. When client device 104n receives the notification of the change to server file journal 162, client device 104n can check a local storage index to determine if the time stamp of the change occurred since the last synchronization, or determine whether synchronization of the specific change has occurred. When client device 104n determines that it is out of synchronization with content management system 100, client device 104n can request content item blocks including the changes, and client device 104n can update its local copy of the changed content items. In some implementations, notification service 146 can query other services or databases of content management system 100, such as server file journal 162, to gain more context for the notification, to determine whether to batch a notification with another notification, to supplement a notification, etc.

Client device 104n may not have a network connection from time to time. In this situation, client device 104n can monitor root of a portion of a native file system associated with content management system 100 for content item changes and queue those changes for later synchronization to content management system 100 when a network connection becomes available. Similarly, a user can manually start, stop, pause, or resume synchronization within content management system 100.

In some implementations, client device 104n may selectively store a portion of the content of an account associated with content management system and store placeholder content items in a native file system for the remaining portion of the content. For example, client device 104n can store a placeholder content item that has the same filename, path, extension, metadata, etc. but lacking the data of the complete content item. The placeholder content item can be a few kilobytes or less in size while the complete content item may be significantly larger. After an account user attempts to access the content item, client device 104n can retrieve the data of the content item from content management system 100 and provide the complete content item to client device 104n. This approach can provide significant space and bandwidth savings while still providing full access to a particular account's content on content management system 100.

Sharing

Content management system 100 can manage sharing of content via sharing service 152. Accounts of content management system 100 can share content with one another by providing a link to the content. Sharing service 152 can then provide access to the shared content item from any computing device (e.g., client device 104n) in network communication with content management system 100. However, in some cases, a link can be associated with access restrictions stored in permissions database 166 and enforced by content management system 100.

Sharing service 152 can also facilitate indirect sharing of content within content management system 100 by enabling an account to share shared content with at least one additional account (i.e., in addition to the original account associated with the content item) so that each account (i.e., the original account, the "direct share" account with which the original account directly shares the content item, and the "indirect share" account with which the direct share account directly shares the content item and with which the original account indirectly shares the content item) has access to the content item. The additional user account can gain access to the content by accepting the content.

To share a content item within content management system 100, sharing service 152 can add an account identifier to a content entry in permissions database 166 associated with the content item, thus granting the added user account access to the content item. Sharing service 152 can also remove user account identifiers from a content entry to restrict a user account's access to the content item. Sharing service 152 can record content item identifiers, user account identifiers given access to a content item, access levels, etc. in permissions database 166.

To share content items outside of content management system 100, sharing service 152 may generate a custom network address, such as a uniform resource locator (URL), which can allow a web browser to access the content item or collection in content management system 100 without authentication. To accomplish this, sharing service 152 can include content identification data in the generated URL, which can later properly identify and return the requested content item. For example, sharing service 152 can include the account identifier and the content path or a content item identifying code in the generated URL. Upon selection of the URL, the web browser can transmit the content identification data included in the URL to content management system 100. Content management system 100 can then use the received content identification data to identify the appropriate content item and return the content item.

In addition to generating the URL, sharing service 152 can also record the URL, or that the URL exists, in permissions database 166. In some implementations, the content entry associated with a content item can include a URL flag indicating whether a URL to the content item exists. For example, the URL flag can be a Boolean value initially set to 0 or false to indicate that a URL to the content item does not exist. Sharing service 152 can change the value of the flag to 1 or true after generating a URL to the content item.

In some implementations, sharing service 152 can associate a set of permissions to a URL for a content item. For example, if a user attempts to access the content item via the URL, sharing service 152 can provide a limited set of permissions for the content item. Examples of limited permissions include restrictions that the user cannot download the content item, save the content item, copy the content item, modify the content item, etc. In some implementations, limited permissions can include restrictions that only permit access to the content item from within a specified geographic and/or logical location (e.g., a user's home or office; a specified city, state, country, or other "geo-fence" or virtual perimeter associated with physical geographic boundaries; a corporate network domain (e.g., @acme.com); a set of network domains approved by an account or accounts associated with a specified domain; content management system 100; and/or third party security service provider; etc.).

Sharing service 152 can also deactivate a generated URL or otherwise unshare a content item. For example, each content entry in server file journal 162 can include an active sharing flag indicating whether the content is still shared, and sharing service 152 may only return a requested content item if the active sharing flag is set to 1 or true. Thus, sharing service 152 can restrict access to a previously shared content item by changing the value of the active sharing flag. This can allow a user to restrict access to the shared content item without having to move the content item, delete the generated URL, etc. Likewise, sharing service 152 can reactivate sharing again by changing the value of the active sharing flag to 1 or true. A user can thus easily restore access to the content item without the need to generate a new sharing mechanism, e.g., a new URL.

In some implementations, content management system 100 can designate a location, such as a URL, for uploading a content item. For example, a first user account can request an upload location from sharing service 152, and provide the upload location to a second user account (or other user in some cases). The second user account or other user can upload a content item to the first user account using the upload location.

Collaboration

Another feature of content management system 100 is to facilitate collaboration between users, such as managed by collaboration service 154. While sharing service 152 provides for sharing of content items between and among multiple accounts of content management system 100, some implementations of sharing service 152 and conventional content management systems may lack certain features or functionality that promote more active engagement between and among users working together on a common endeavor. Thus, in some implementations, content management system 100 can support collaboration features (i.e., functionality that distinguishes collaboration service 154 from sharing service 152) such as commenting on content items, concurrently creating and editing content items (e.g., via strategies based on content item locking, serialization graph checking, timestamp ordering, etc.), instant messaging, and providing presence and viewed state information regarding content items, etc. In other implementations, sharing service 152 can include all of the functionality provided by collaboration service 154 or a different subset of features provided by collaboration service 154. Considerations such as limited resources (e.g., collaboration features may use additional processing, storage, network, and other computing resources), technical limitations (e.g., a platform or operating system is a closed system that prohibits third party enhancements necessary to support certain collaboration features), native support (e.g., a source code control tool may include versioning functionality that users find adequate for their needs), user preferences, etc. can drive what content management system 100 offers as a sharing feature or a collaboration feature.

In some implementations, collaboration service 154 can collect and report information regarding account interactions with a "collaboration" content item or a content item that supports some or all of the collaboration features discussed above. In some implementations, collaboration service 154 can store collaboration content items separately from "non-collaboration" content items or content items that do not support the collaboration features. In other implementations, collaboration service 154 can store collaboration content items and non-collaboration content items in the same database(s) or storage with additional metadata for supporting collaboration, such as a flag or other metadata indicating that the content item is a collaboration content item, multiple author and/or editor identifiers, interaction information, comments, etc. Collaboration service 154 can store the metadata for the collaboration content items to metadata databases 160 or other suitable database(s) or storage to allow for search and retrieval of the collaboration content items. Multiple accounts may access, view, edit, and otherwise collaborate on collaboration content items at the same time or at different times.

In some implementations, collaboration service 154 can report when a user views or otherwise accesses the collaboration content item and/or collaboration service 154 can request notification service 146 to send notifications to other client devices 104 having access to the collaboration content item when any one client device accesses the collaboration content item. Notification service 146 can then notify all client devices regarding access to the collaboration content item by the one client device. In some implementations, the interaction data can also serve as a proxy for the presence of a user owning and/or operating the one client device.

In some implementations, collaboration service 154 can facilitate commenting associated with a content item, even if an application used to create the content item does not natively support commenting functionality. Collaboration service 154 can store the comments in metadata databases 160.

In some implementations, collaboration service 154 can originate and transmit notifications for users. For example, a first user can mention a second user in a comment and collaboration service 154 can send a notification via notification service 146 to the second user regarding the comment. Various other events can also trigger notifications, such as deleting a content item, modifying a content item, sharing a content item, etc. In general, collaboration service 154 can provide a messaging platform from which users can send and receive instant messages, short message service (SMS) text messages, voice calls, emails, etc.

Cross-Platform Support

As discussed, content management system 100 is platform-agnostic, meaning that content management system 100 can generally support any client device (i.e., of varying types, capabilities, operating systems, etc.) capable of communication over a network, such as server 104a (e.g., a physical or a virtual server), desktop computing device 104b, laptop computing device 104c, tablet computing device 104d, smartphone 104e, and wearable device 104f (e.g., a watch; eyeglasses, a visor, a head-mounted display or other device generally worn over a user's eyes; headphones, ear buds, or other device generally worn in or over a user's ears; etc.).

Client devices 104 can also include an "infotainment system" (i.e., a computing device integrated with a private or a public means of transportation), a "smart" home device (e.g., a television, a set-top box, a digital video recorder (DVR), a digital video disc (DVD) player or other media player, a video game console, etc.), among other examples. Client tier 102 can provide any number of interfaces for client devices 104 to interact with server tier 120, such as application programming interface (API) endpoints 110 (e.g., such as those based on the simple object access protocol (SOAP), a service oriented architecture (SOA), a representational state transfer (REST) architecture, a resource oriented architecture (ROA), etc.); web interface 112; desktop client interface 114; mobile client interface 116; etc.

In some implementations, API endpoints 110 can rely on a stateless, client-server, cacheable communications protocol (e.g., HTTP) to provide web services. For example, content management system 100 can provide access to API endpoints 110 as uniform resource identifiers (URIs) to which client devices 104 can send HTTP requests, such as POST, GET, PUT, and DELETE, etc., to access the resources and services of content management system 100.

Effectively any computing device with a network connection, including server 104a, desktop computer 104b, laptop 104c, tablet 104d, smartphone 104e, and wearable device 104f, can communicate and interact with content management system 100 via API endpoints 110.

Figure 8:
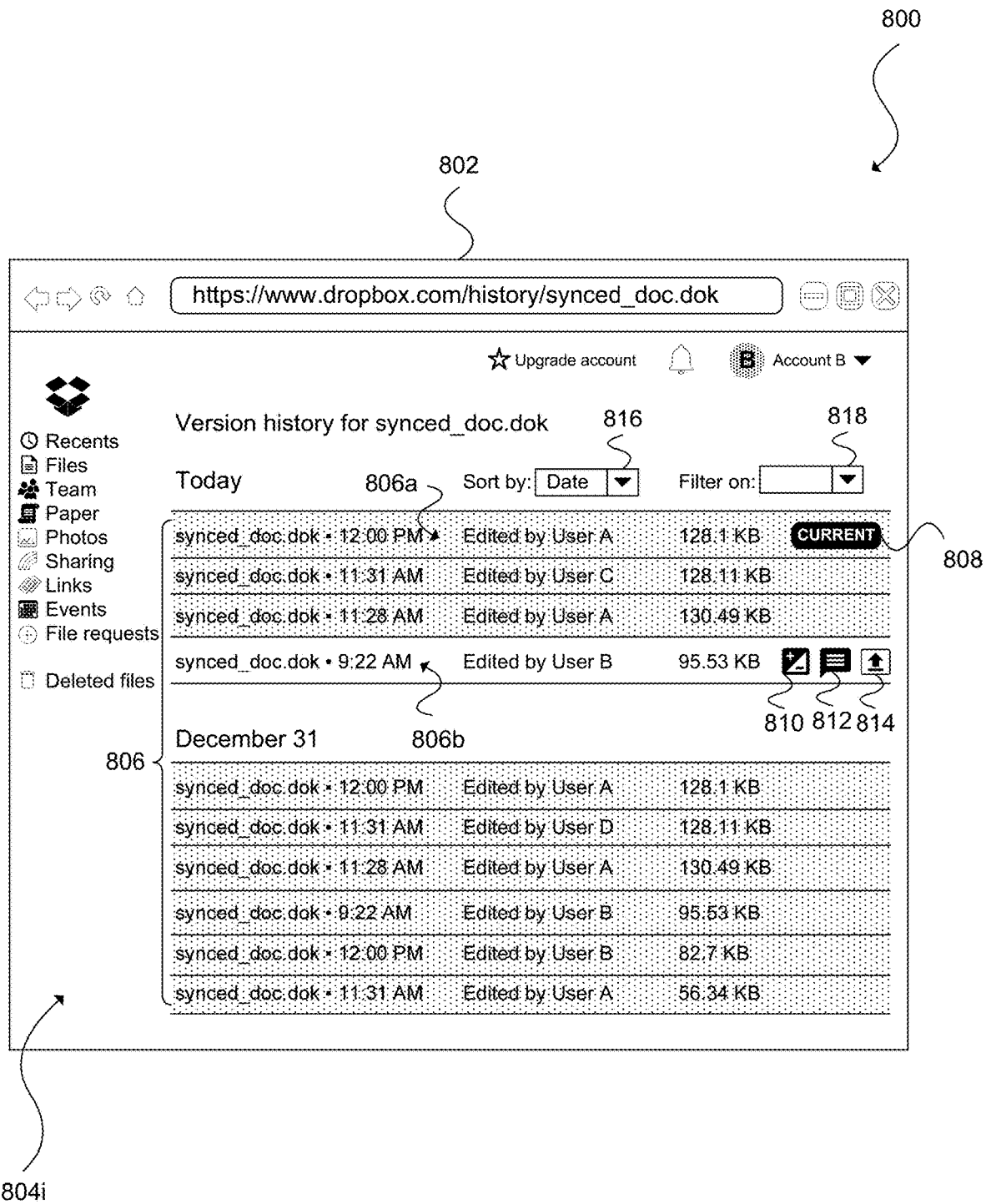
FIG. 8 shows an example of a client interface for implementing aspects of the present technology.

Web interface 112 is a web application or website that client device 104n can navigate to in a web browser to a web address associated with an account provided by content management system 100. Client devices 104 can perform various actions on content items of an account through web interface 112, including accessing or making changes to content items associated with the account. FIG. 8 (e.g., client application interface 804i) shows an example of an approach for implementing web interface 112. Generally any computing device with a web browser, including server 104a, desktop computer 104b, laptop 104c, tablet 104d, smartphone 104e, and wearable device 104f, can communicate and interact with content management system 100 via web interface 112.

Desktop client application interface 114 is a client application that runs on an operating system of certain classes of computing devices (e.g., server 104a, desktop computer 104b, laptop 104c, etc.) but typically do not run on other classes (e.g., tablet 104d, smartphone 104e, and wearable device 104f). FIGS. 4, 5, 6A, and 6B show examples of approaches for implementing desktop client application interface 114. Mobile client application 116 runs on an operating system of certain classes of computing devices not supported by desktop client application interface 114 (e.g., tablet 104d, smartphone 104e, wearable device 104f, etc.) and unlikely to run on operating systems of classes of computing devices supported by desktop client interface 114 (e.g., server 104a, desktop computer 104b, laptop 104c, etc.).

While content management system 100 includes specific components in this example, one of ordinary skill in the art will understand that the configuration of content management system 100 is simply one possible configuration and that other configurations with more or less components are also possible.

Figure 2:
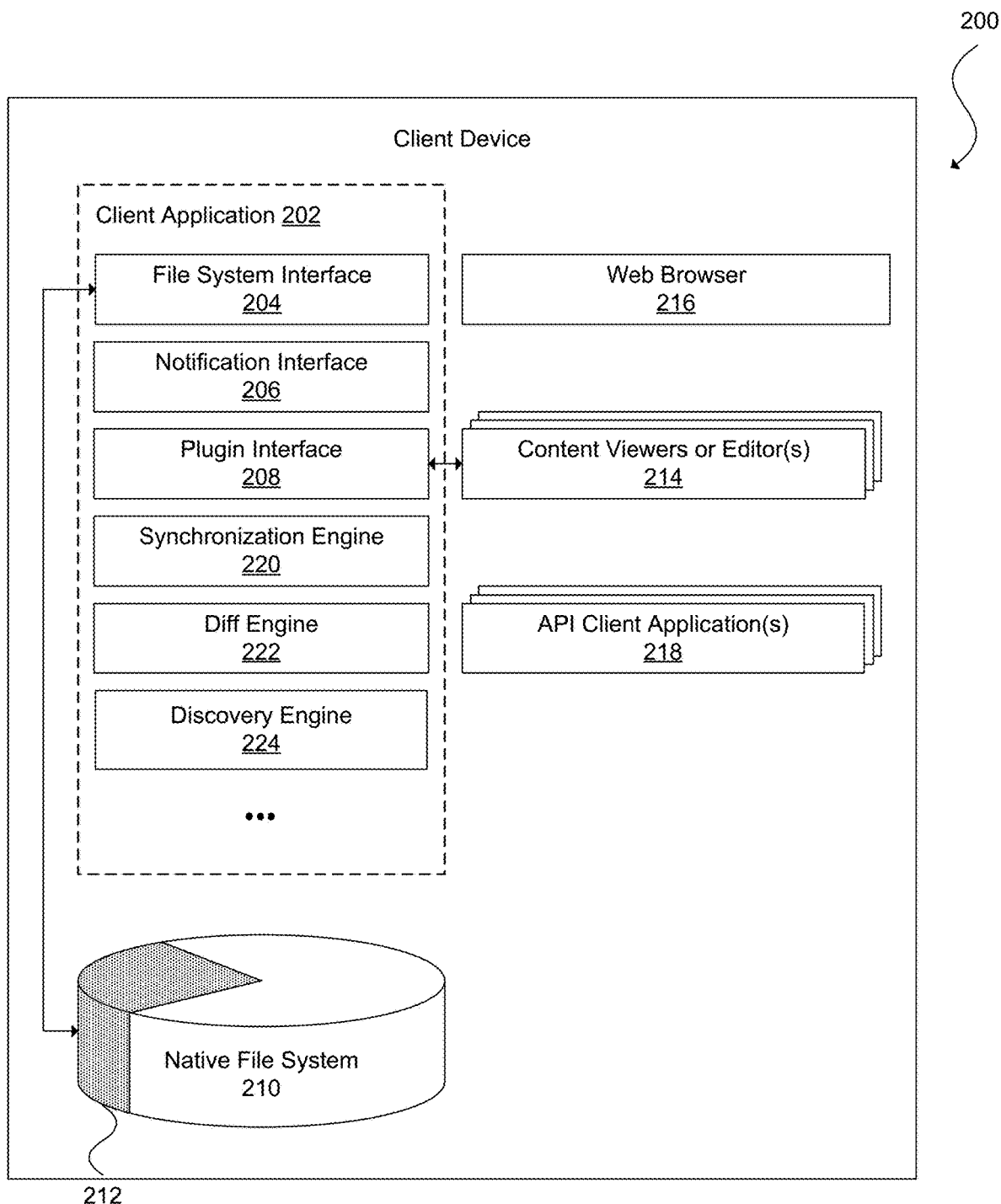
FIG. 2 shows an example of a client device for implementing aspects of the present technology.

FIG. 2 shows an example of client device 200 (e.g., client device 104n) including a number of components for communicating with a content management system (e.g., content management system 100). The components can include one or more databases or storage structures for storing data relevant to the operation of the system and one or more modules and/or client applications for interacting with the storage structures and/or services provided by the content management system. This disclosure provides additional details regarding each of the components in FIG. 2 in more detail below; however, one skilled in art will understand that client device 200 is simply one possible configuration and that other configurations with more or less components are also possible.

Client device 200 can include client application 202, which may provide certain functionality specific to the content management system. For example, client application 202 can include a number of interfaces for a user to interact with to manage her content within the content management system, such as file system interface 204, notification interface 206, plugin interface 208, etc. File system interface 204 can extend native file system 210 by enabling a user to select of a subset of native file system 210 (i.e., local content items 212) to be in synchronization with content items of an account of the content management system. For example, client application 202 may designate a directory (e.g., folder, partition, segment, drive, bin, repository, container, or other similar data structure) within native file system 210 by default or a user may designate the directory as a root directory of client application 202. When a user changes (e.g., deletes, modifies, copies, moves, or otherwise manipulates content items) local content items 212 in root, client application 202 can synchronize those changes with the content management system. Likewise, when a user changes content items within authorized client device 104n and/or within an interface (e.g., interfaces 110, 112, 114, 116, etc.) provided by the content management system, the content management system can synchronize those changes to client device 200.

Figure 4:
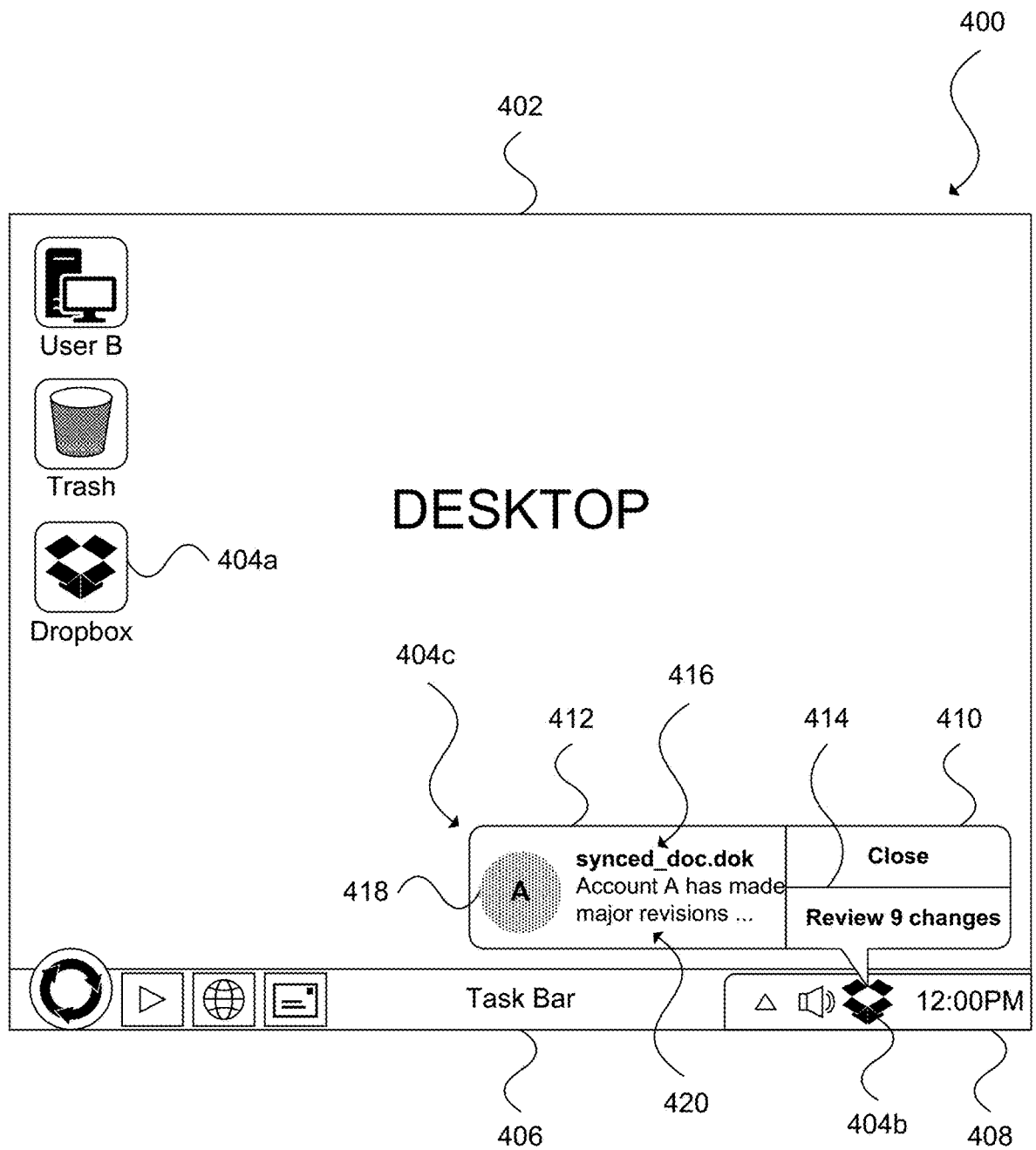
FIGS. 4, 5, 6A, and 6B show examples of client interfaces for implementing aspects of the present technology.

Notification interface 206 may extend the notification functionality provided by the operating system of client device 200. Notification interface 206 can generate notifications when there is activity relating to local content items 212, such as updates (e.g., adding new content items, deleting content items, modifying content items, etc.) to local content items. In some implementations, the notifications may also include interface elements that enable a user to perform tasks from within the notifications rather than requiring the user to bring up client application 202 to perform the tasks. FIG. 4 (e.g., client application interface 404c) and FIG. 6A (e.g., client application interface 604g) show example approaches for implementing notification interface 206.

Figure 6A:
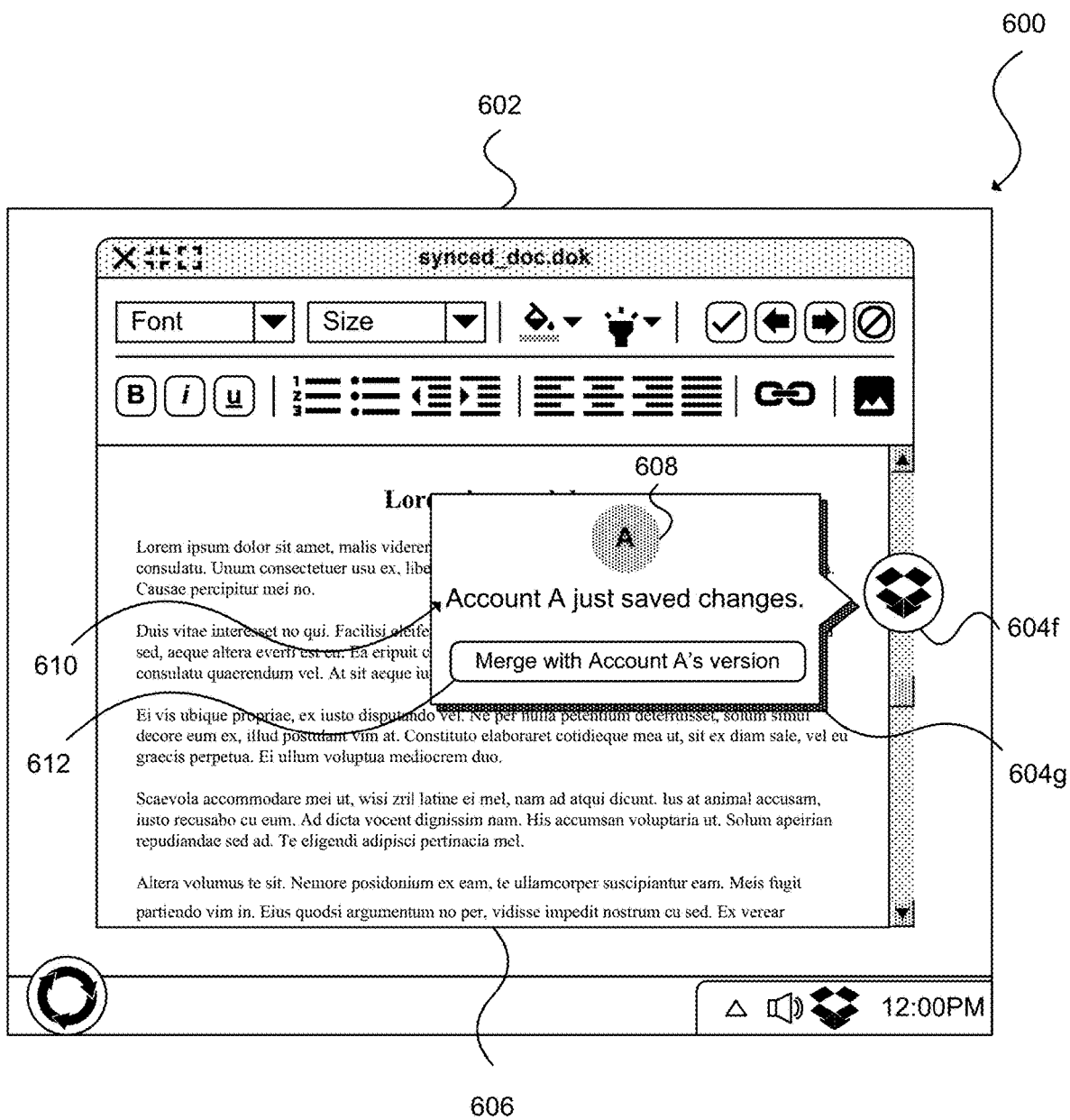

Plugin interface 208 extends functionality of content viewer or editor 214 by adding features of the content management system to local content items 212 edited by content viewer or editor 214. For example, a content item placed in root may be a file type that is associated with a native or default application, such as content viewer or editor 214. That is, when a user selects the file (e.g., by double-clicking or double-tapping an icon associated with the content item), content viewer or editor 214 can automatically launch (or move to the foreground or otherwise become the active application if already running on client device 200) to open the content item for editing. Content viewer or editor 214 can display an interface element, such as an icon, a button, a badge, or other selectable interface element for an application, a plug-in, a function, a shortcut, etc., from which notifications appear to spawn, regarding the content item or other related content items. In addition, a user may interact with plugin interface 208 to perform certain tasks related to the content item. This can be especially advantageous if client application 202 offers features not supported by content viewer or editor 214. For example, client application 202 may support commenting for local content items 212 but content viewer or editor 214 may not provide such functionality. A user can nonetheless review or provide comments for a content item by interacting with plugin interface 208 to display comments for the content item. Other functionality that plugin interface 208 can provide include presenting a synchronization status for the content item, locking the content item for editing, providing a version history of the content item (e.g., reverting to a previous version, presenting differences or a "diff" between specified versions, merging different versions, resolving merge conflicts, etc.), among other operations. FIG. 6A (e.g., client application interfaces 604f and 604g) and FIG. 6B (e.g., client application interfaces 604f and 604h) show example approaches for implementing plugin interface 208.

Client device 200 may also include web browser 216 as another tool to communicate and interact with the content management system. In some cases, web browser 216 can communicate with the content management system via HTTP. Web browser 216 may also execute client-side scripting languages, such as JavaScript, or other web browser executable languages, and then send the results to the content management system. FIG. 8 (e.g., client application interface 804i) shows an example of an approach for implementing web interface 112.

Other tools for client device 200 to communicate and interact with the content management system can include application programming interface (API) client application 218. For example, the content management system may provide API endpoints (e.g., API endpoints 110) for third party applications to access certain resources or services of the content management system, such as via the SOAP or REST architecture as examples.

In addition to the various interfaces and client applications discussed above, client application 202 can also include additional components for coordinating interaction with the content management system, such as synchronization engine 220, diff engine 222, discovery engine 224, etc. Synchronization engine 220 can generally support synchronization of local content items 212 and corresponding content items managed by the content management system and/or located on other authorized client devices.

In some implementations, synchronization engine 220 can monitor local content items 212 to identify those content items that are not in synchronization with the content management system. Upon identifying unsynchronized content items, synchronization engine 220 can upload the unsynchronized content items to the content management system. In some implementations, synchronization engine 220 can begin upload of an unsynchronized local content item immediately upon identifying that local content item is out of sync with a corresponding content item of the content management system.

Alternatively, in some implementations, synchronization engine 220 can limit the number of concurrent content item uploads to the content management system. For example, synchronization engine 220 may only upload one unsynchronized content item at a time such that when upload of that content item completes, upload of the next unsynchronized content item may begin. Alternatively, in some implementations, synchronization engine 220 can concurrently upload up to a specified number of unsynchronized content items (e.g., 2, 3, 4, . . . , etc.).

In some implementations, synchronization engine 220 can queue unsynchronized content items for a determined period of time. For example, upon identifying an unsynchronized content item, synchronization engine 220 can add that content item to a synchronization queue for uploading to the content management system at the determined period of time. Native file system 210 can store the synchronization queue. In some implementations, synchronization engine 220 can add an unsynchronized content item to the synchronization queue by appending an identifier associated with that content item to the queue. Synchronization engine 220 can subsequently use the identifier to locate the queued unsynchronized content item in native file system 210.

In some implementations, synchronization engine 220 can upload the unsynchronized content items in the synchronization queue in a first-in, first-out (FIFO) order. Alternatively, in some implementations, synchronization engine 220 can upload unsynchronized content items in the synchronization queue in last-in, first-out (LIFO) order, such that the unsynchronized content item most recently added to the synchronization queue uploads first. Other queuing strategies are also possible, such as priority-based queuing, round robin-scheduling, smallest content item first, shortest remaining upload time, token or bucket-based queuing, etc.

Diff engine 222 can generally determine differences between versions of a content item, such as to support delta synchronization or version history management. As discussed, delta synchronization can include identifying delta blocks, limiting downloading and uploading to these blocks, and avoiding transfer of entire content items every time they change. Diff engine 222 can also determine the differences or the "diff" (i.e., text-based differences, such as based on the actual text, mark-up, and/or other metadata) between two or more versions of a content item. In the example of FIG. 2, delta synchronization and diff determination are separate features with little to no overlap. For example, delta synchronization may involve determining byte-wise differences between blocks of different versions of a content item while diff determination may involve resolving text-based differences between different versions of the content item. In some implementations, client device 200 may combine or integrate delta synchronization and diff determination to reduce the overall utilization of computing resources that client device 200 may otherwise consume if delta synchronization and diff determination were entirely separate processes. For example, the content management system may encode each version of a content item as a stand-alone content item without any context as to the textual differences from a previous version. However, the content management system may store the text-based differences as part of the metadata for the content item such that the content management system can process the diff once and retrieve the diff from storage for every other request for the diff. This approach can reduce the use processing resources but may increase utilization of storage resources. In some implementations, client device 200 can perform diff determination locally and save the results to native file system 210. This approach can reduce network resources.

In some implementations, the content management system may be capable of automatically providing a diff between two or more arbitrary or user-specified versions of a content item (e.g., a diff between the 7th version and the 3rd version). The content management system may utilize a strategy similar to key frames to take a balanced approach between processing the diff anew every time there is a diff request and storing every possible permutation of differences between versions of the content item. For example, the content management system can store major versions as stand-alone content items and minor versions as differences between adjacent versions of the content item. This can reduce storage resources relative to the approach of storing every permutation of differences between versions of the content item and reduce processing resources relative to the approach of performing diff determination for every diff request. In some implementations, the content management system may utilize each approach and/or other approaches depending on the usage pattern of each account of the content management system. In addition or alternatively, the content management system may utilize a particular approach depending on file type, file size, or other metadata associated with the content item.

In some implementations, diff engine 222 may also perform certain post-processing tasks on diffs. For example, diff engine 222 can store the diff to memcache to provide authorized accounts with access to a diff between a latest version and next-to-latest version of the content item in real-time or substantially real-time at a period of time when those accounts are most likely to review the diff.

Figure 7:
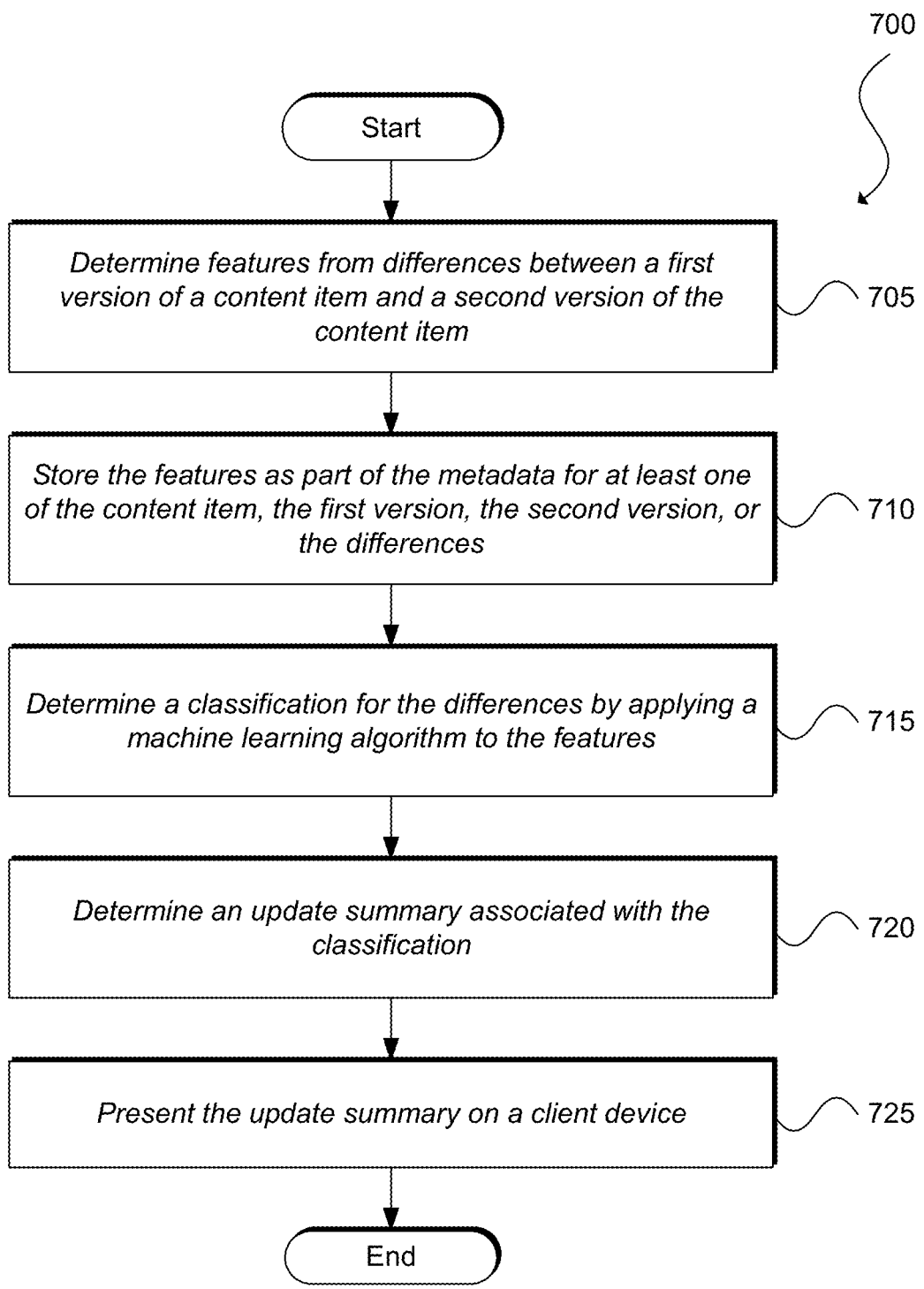
FIG. 7 shows an example of a process for generating a summary of the differences between and among multiple versions of a content item.

Diff engine 222 can also analyze the diff for various metrics that may be helpful to understand the changes between and among versions of a content item, such as by tallying up the total number of edits between versions, the total number of each edit type (e.g., insertion, deletion, modification, relocation, formatting change, etc.), particular portions of the content item edited (e.g., paragraph number(s), section number(s), named section(s) (e.g., technical field, background, summary, etc.), total number of content segments edited, etc. In some implementations, diff engine 222 can also extract features from the diff and other related data to support automated generation of an edit summary. Discussion with respect to FIG. 7 provides additional details regarding this functionality.

Although diff engine 222 is a component of client application 202 in this example, in other implementations, diff engine 222 may be a component of a native application (e.g., content viewer or editor 214) on client device 200 associated with a file type of the shared content item, a component of a third party application (e.g., API client application 218), a service of content management system 302, a third party service, etc.

Discovery engine 224 can support LAN synchronization and/or collaboration, among other features. With respect to LAN synchronization, discovery engine 224 may periodically send out a beacon (e.g., user datagram protocol (UDP) broadcast packets) over a specified port (e.g., port 17500) and listen for responses to determine whether other authorized client devices are on the same LAN as client device 200. If so, client device 200 can attempt to upload content items to and/or download from these local client devices before uploading to and/or downloading from remote servers. This can save time and bandwidth and other computing resources. With respect to collaboration, discovery engine can use a similar protocol for quickly locating other accounts that include collaboration content items with which the account associated with client device 200 shares.

Figure 3:
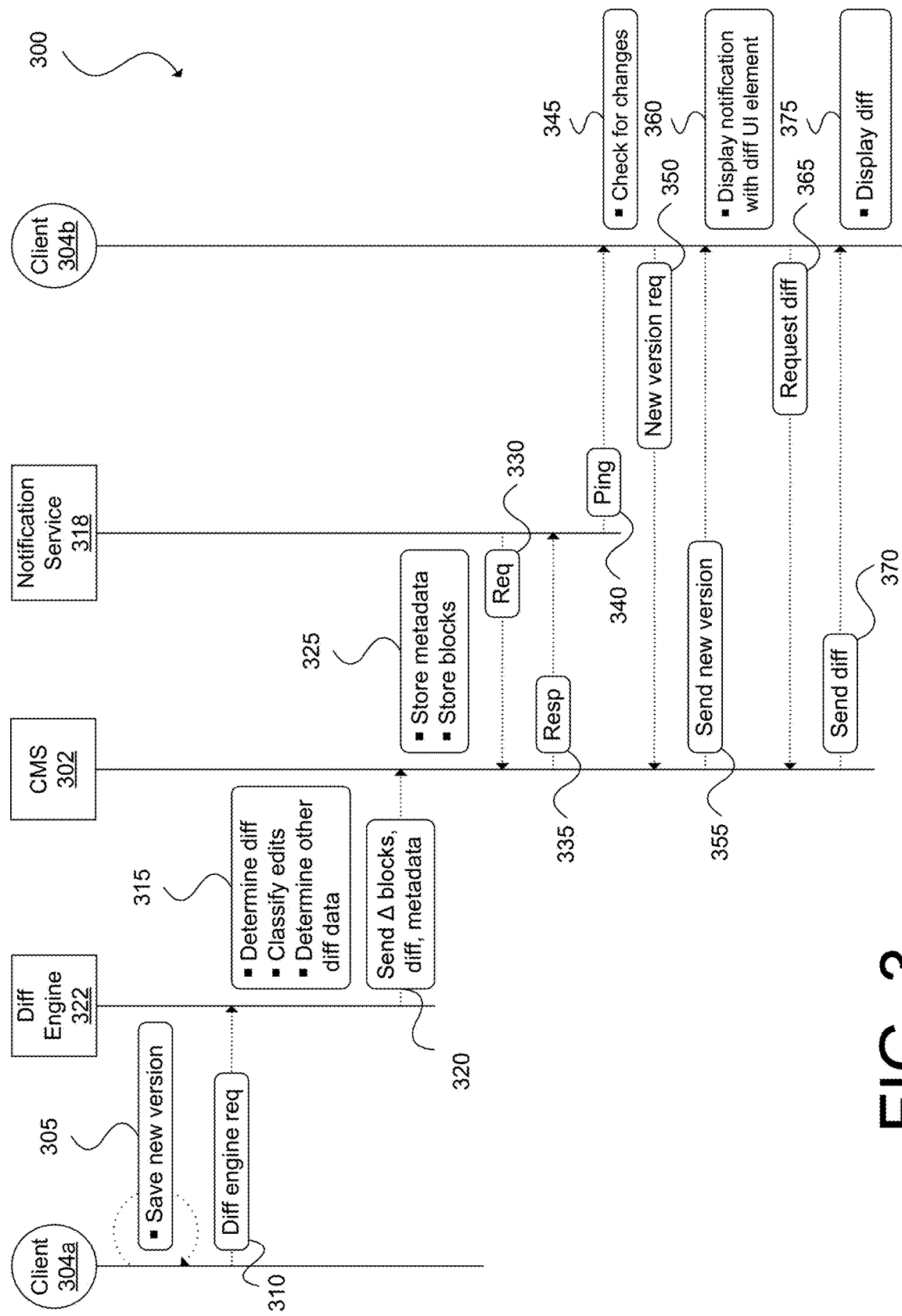
FIG. 3 shows an example of a sequential diagram for synchronizing a content item between and among multiple computing devices.

FIG. 3 shows an example of sequential diagram 300 for synchronizing a content item between client devices 304a and 304b (e.g., client device 200) of content management system 302 (e.g., content management system 100). A person of ordinary skill in the art will understand that, for any process, method, sequence, etc. discussed in the present disclosure, there can be additional, fewer, or alternative steps performed in similar or alternative orders, or in parallel, within the scope of various implementations of the present technology unless otherwise stated. Sequential diagram 300 can begin at sequence 305 with client device 304a saving a first version (e.g., the latest version) of a synchronized content item. Upon completion of the save, a synchronization service (e.g., synchronization service 150) of content management system 302 or a synchronize engine (e.g., synchronization engine 220) of client device 304a may send a request to diff engine 322 (e.g., diff engine 222) at sequence 310 to determine differences between the first version and a second version (e.g., the next-to-latest version) of the content item. As discussed, diff engine 322 may be a component of a client application (e.g., client application 202) on client device 304a and client device 304b that performs tasks specifically for content management system 302, a component of a native application (e.g., content viewer or editor 214) on client device 304a and client device 304b, a component of a third party application (e.g., API client application 218), a service of content management system 302, a third party service, etc. However, in this example, diff engine 322 resides on client device 304a and/or client device 304b as a component of a client application of content management system 302, a native application, or a third party application.

At sequence 315, diff engine 322 may determine the differences between the first version and the second version of the content item. This can include determining the delta between the two versions for purposes of encoding only modified portions of the content item. As discussed, this is an example of implementing delta synchronization and can improve operation of content management system 302. For instance, instead of transferring the entire content item every time there is an update, only changes are uploaded and/or downloaded. Determining the differences between the two versions can also include generating a diff or a comparison between the two versions for real-time or substantially real-time presentation to other authorized accounts. Diff engine 322 can also extract features for classifying or categorizing the first or latest version to generate a descriptive summary of the differences, such as for conveying the nature of the differences in more easily understood terms, automating commenting, enriching version history metadata for improving sorting, filtering, keyword searching, etc. In addition or alternatively, diff engine 322 can also classify or categorize individual edits within the first version to improve navigation (e.g., by enabling backward/forward skipping in the diff by individual edit type), determine a number of edits for quantitative filtering, generate analytical data, etc.

Sequential diagram 300 may continue to sequence 320 in which diff engine 322 transmits delta blocks, the diff, and/or other metadata associated with the first or latest version of the synchronized content item to content management system 302. Diff engine 322 can send an update to a synchronization engine (e.g., synchronization engine 220) on client device 304a or a synchronization service of content management system 302 (e.g., synchronization service 150) to initiate a synchronization protocol with content management system 302 to store the metadata and delta blocks at sequence 325. In some implementations, sequences 320 and/or 325 can include client device 304a attempting to commit a blocklist representing the first version (or differences between the first version and the second version) to a metadata service (e.g., metadata service 144) of content management system 302 under a namespace and path corresponding to the synchronized content item. The metadata service can check to see if the hashes of the blocklist already exist. In this example, the metadata service discovers that the hashes are unknown, in which case the metadata service can send to client device 304a a "need blocks" request indicating the missing blocks. Client device 304a can then communicate with a content storage service (e.g., content storage service 134) of content management system 302 to store the missing blocks to block storage (e.g., block storage 136). Upon completing storage of the missing blocks to the block storage, client device 304a can attempt to commit the blocklist again and should succeed on this attempt. The metadata service can then update a server file journal (e.g., server file journal 162) of content management system 302 to reflect successful storage of the first or latest version.

In some implementations, content management system 302 can initiate the synchronization protocol by retrieving the first or latest version from client device 304a. In some implementations, content management system 302 may be capable of streaming synchronization and can stream new blocks to client device 304b as soon as the block storage stores the new blocks. In some implementations, content management system 302 may be capable of LAN synchronization and client device 304b can fetch the new blocks directly from client device 304b if client devices 304a and 304b are on a same LAN.

Notification service 318 (e.g., notification service 146) may monitor content management system 302 for changes to the synchronized content item, such as by sending a series of requests to content management system 302, including a request at sequence 330. After content management system 302 completes committing at least one block of the first or latest version to storage, content management system 302 can send a reply at sequence 335 indicating that the synchronized content item has changed and that the changes include at least the new block. Notification service 318 can ping client device 304b at sequence 340 to notify client device 304b that the block is available for download.

At sequence 345, client device 304b can check whether its version of the synchronized content item has changed or whether its version is currently open and possibly in the course of changing. In this example, there have been no changes, and client device 304b can initiate download of the block by sending content management system 302 a request for the block at sequence 350. At sequence 355, content management system 302 may send the block to client device 304b. After client device 304b receives the entirety of the first version, client device 304b can generate a notification regarding availability of that version at sequence 360.

FIG. 4 shows an example of client—400 including desktop interface 402 and client application interfaces 404a, 404b, and 404c (collectively, client application 404) for generating a notification pertaining to the availability of a first or latest version of a synchronized content item, such as discussed above at sequence 360. Desktop interface 402 includes task bar 406 and notification area 408 (also sometimes referred to as a system tray or status area) provided by an operating system of a client device (e.g., client device 200). A notification area typically displays icons for operating system and other features that may not otherwise have a presence on desktop interface 402 or that regularly provide application updates and/or status information. For example, notification area 408 includes a chevron for changing settings for task bar 406, notification area 408, and/or other operating system and program features; a volume meter; client application interface 404b (e.g., an icon) for associating notifications with client application 404, changing settings for client application 404, generating additional interfaces for interacting with client application 404, etc.; and a current time.

In this example, the computing device, such as a server, a desktop computer, a laptop, etc., can be owned and/or operated by a user having an account, Account B, associated with a content management system (e.g., content management system 100). To interact with content associated with the content management system or the content management system itself, an operating system of the computing device can include client application 404. For instance, client application interface 404a is an icon that, upon selection, causes the operating system to display a client application interface closely integrated with a native file system of the operating system (sometimes referred to as a file manager, a file explorer, a file browser, a directory editor, a finder, etc.). Typical file managers have multiple panes, a pane for displaying a tree view of the file system and navigating the file system, a pane for displaying content of a selected directory or folder, a pane for previewing a selected content item, etc. File managers can generally also include additional user interface elements for easing navigation of the file system, such as an address bar for indicating a selected directory or folder, back and forward buttons, reload or refresh buttons, a search bar for locating specified content items, etc. Conventional file managers represent content items using icons, such as icons based on the file type of a content items or file folder icons representative of directories or folders. In some implementations, a file manager can display graphical elements proximate to or overlaying file-type icons and/or file folder icons to indicate a synchronization status of a content item (e.g., a green check to indicate that a content item is in sync, blue circular progress arrows to indicate that synchronization is in progress for the content item, a gray minus sign to indicate that the content item does not synchronize with the content management system intentionally, a red "x" to indicate that the content item has failed to sync, etc.). In some implementations, client application 404 can operate in conjunction with the content management system to synchronize Account B's content stored locally on the computing device with Account B's content stored remotely by the content management system and other authorized client devices. As such, Account B's local collection of content items can be in synchronization with those stored by the content management system and other authorized client devices.

Client application interface 404b is an icon that, upon selection, causes the operating system to present a client application interface for performing certain operations associated with content and/or the content management system. Additional details discussed with respect to FIG. 5 and elsewhere in the present disclosure describe examples of some of these operations. Client application interface 404b can also associate or otherwise indicate that a particular notification is related to client application 404, content items associated with the content management system, and/or the content management system itself, such as a via an arrow from a notification interface, such as client application interface 404c, to client application interface 404b.

In the example of FIG. 4, Account B may share one or more content items with another account, Account A, associated with the content management system. For example, the respective users of Account A and Account B may be co-workers working collaboratively on a presentation, friends planning a camping trip and allocating responsibilities for certain gear and supplies via a spreadsheet, family members coordinating their schedules using a calendar, etc. Account A may make updates to the synchronized content item(s) and save the changes locally to her client device. The content management system can receive the first or latest version(s) of the content item(s) (e.g., by Account A's client application pushing data to the content management system and/or the content management system (or in LAN synchronization mode, Account B's client application) pulling data from Account A's client device, or some combination of these techniques), and the content management system can propagate the first or latest version to Account B (e.g., by the content management system transmitting data to Account B's client device, client application 404 fetching the data from the content management system, and/or client application 404 fetching the data from Account A's client device). Receipt of the synchronized content item by Account B at the client device can cause the operating system to display client application interface 404c.

A notification is generally a message displayed by an operating system for system and program features without dedicated user interfaces, or displayed outside of an application's user interface(s), such as to provide real-time or near real-time updates and/or status information for the application. Some operating systems present the notification within an interface for performing various operations for a client application associated with the notification. For example, client application interface 404c includes close pane or button 410 for closing the notification interface; information button or pane 412 for displaying information regarding the first or latest version of the content item; and review pane or button 414 for reviewing differences between specified versions of the content item. In some implementations, an operating system may automatically close client application interface 404c without detecting selection of close button 410 if there is no interaction with client application interface 404c for a predetermined period of time. In some implementations, the operating system may display multiple notifications related to client application 404 at once with each notification interface fully visible or overlaying one another with a portion (e.g., a content item name or other identifier) of underlying notification interfaces visible. When the operating system displays multiple notifications, the positioning (e.g., top to bottom, left to right, etc.) of the notifications may correspond to a time the computing device received each content item, a priority of each content item, an alphabetic order (e.g., content item name, user name, etc.), some combination of these factors, or other suitable sorting criteria.

Information pane 412 can generally include any information that may be helpful to understand updates to a synchronized content item. In the example of FIG. 4A, information pane 412 includes updated content item name 416 indicating that the computing device has received changes to a synchronized content item, "synced_doc.dok"; account icon 418 identifying Account A as the account making the changes to the content item; and update summary 420 describing the nature of the changes to the content item. Additional details discussed with respect to FIG. 7 and discussed elsewhere in the present disclosure describe examples of how to automatically generate a descriptive update summary 420. In some implementations, information pane 412 can operate as a virtual button that, upon selection, causes the operating system to display a preview of the latest version of the shared document, such as by using one or more of the approaches described in U.S. patent application Ser. No. 13/826,436, filed Mar. 14, 2013, and entitled "Providing a Content Preview," which is incorporated herein by reference in its entirety.

Returning to FIG. 3, client device 304b may detect selection of a user interface element (e.g., review button 414) associated with presentation of a diff or comparison between the latest version and the next-to-latest version. At sequence 365, client device 304b may send a request for the diff to content management system 302. Content management system 302 can send the diff in response at sequence 370. In this example, content management system 302 can store the diff as part of the metadata of the synchronized content item or can quickly determine the diff from the delta blocks for the content item. In other implementations, content management system 302 may not store diffs or process diffs from metadata and block server data. Instead, client device 304b can send a request to its local diff service. After client device 304b obtains the diff, client device 304b can display the diff at sequence 375.

Figure 5:
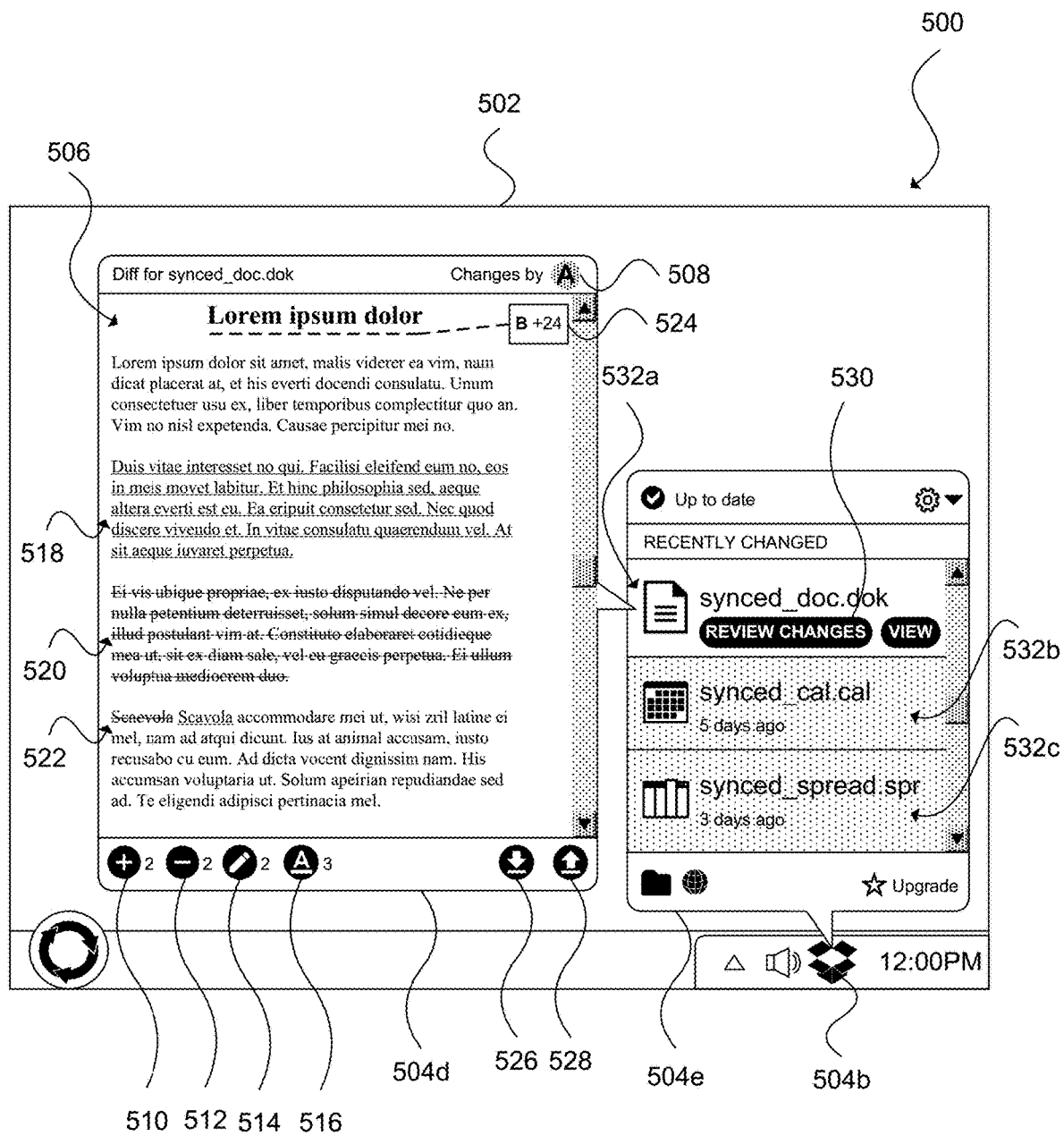

FIG. 5 shows an example of client interface 500 including desktop interface 502 and client application interfaces 504b, 504d, and 504e (collectively, client application 504) for presenting diff 506, a comparison between specified versions of a content item. In this example, diff 506 represents differences between a first or latest version of the content item received by a content management system (e.g., content management system 100) from a client device (e.g., client device 200) associated with an account, Account A, of the content management system and a second or next-to-latest version of the content item. Desktop interface 502 is part of an operating system running on a client device (e.g., client device 200) owned and/or operated by a user having an account, Account B, with the content management system.

Client application interface 504d is an example of a non-native content viewer for presenting the diff. That is, the operating system may associate a default or native application with a file type of diff 506 but client application 504 presents diff 506 via its own interface, client application interface 504d. In some implementations, the client device can present client application interface 504d via a web browser. As discussed, this can facilitate cross-platform collaboration or can be a user's individual preference. In some implementations, client application 504 can include a component integrated with a native application for presenting diff 506, such as discussed with respect to FIG. 6B and elsewhere in the present disclosure.

Client application interface 504d can include a number of interface elements to help a user understand diff 506, including an avatar icon 508 or other identifier identifying the account saving the first or latest version of the synchronized content item to the content management system, addition icon 510 indicating a number of insertions (e.g., insertion 518) between the latest version and the next-to-latest version, subtraction icon 512 indicating a number of deletions (e.g., deletion 520) between the latest version and the next-to-latest version, pencil icon 514 indicating a number of modifications (e.g., changes that do not span an entire line or other content segment, such as modification 522), and underlined "A" icon 516 indicating a number of formatting changes (e.g., formatting change 524), between the latest version and the next-to-latest version.

Client application interface 504d also includes navigational icons 526 and 528 to respectively skip backward to a previous edit or forward to a next edit in diff 506. In this example, edit type icons 510, 512, 514, and 516 can also operate as buttons. Selection of one of edit type icons 510, 512, 514, and 516 can alter the functionality of navigational icons 526 and 528 to respectively skip backward to a previous edit of the selected edit type and forward to a next edit of the selected edit type.

Client application 504 may bring up client application interface 504d upon selection of an appropriate interface element (e.g., review changes button 414) presented within a notification interface (e.g., client application interface 404c). In this example, client application 504 brings up client application interface 504d upon selection of review changes button 530 within the "Recently Changed" interface, client application interface 504e. Client application 504 may present client application interface 504e upon selection of client application interface 504b, i.e., an icon within a notification area of desktop interface 502.

Client application interface 504e includes a list of the latest changed content items, content items 532a, 532b, and 532c, received by the client device. Client application interface 504e can detect a "mouse over" (i.e., positioning a virtual pointer or cursor over a selectable user interface element), a hover input (i.e., a finger or other physical pointer over a selectable user interface element), a quick tap, a voice command, etc. as a selection of content item 532a. Client application interface 504e can indicate selection of content item 532a by displaying review changes button 530 and the adjacent view button as shown in this example. Selection of the view button can cause client application 504 to open content item 532a in a non-native or native content viewer or editor. In this example, client application interface 504*e* also indicates a selection of content item 532*a* by displaying content item 532*a* more prominently relative to and/or graying out content items 532*b* and 532*c*. In this example, client application interface 504*e* includes other elements for interacting with client application 504, beginning from the top left corner and moving clockwise, an "Up to date" icon to indicate a synchronization status of the client device, a gear icon and chevron for changing the settings of client application 504, a scrollbar, a star icon for upgrading to premium services provided by the content management system, a globe icon for opening a web browser and presenting a web interface of client application 504, and a folder icon for opening a native file system interface of Account B's content items stored locally on the client device.

Returning to FIG. 3, there may be times at sequence 345 that client device 304*b* discovers that its version is currently open and/or includes unsynchronized saved changes. Instead of downloading the latest version and overwriting client device 304*b*'s version of the synchronized content item (i.e., the next-to-latest version in addition to any changes made by client device 304*b*), client device 304*b* may attempt to merge the two versions. A client application (e.g., client application 202) associated with content management system 302 running on client device 304*b* can simplify this process by substantially automating the merge.

FIG. 6A shows an example of client interface 600 including desktop interface 602, client application interfaces 604*f* and 604*g* (collectively, client application 604), and word processing interface 606 for generating an application notification regarding the availability of a latest version of a synchronized content item. In this example, client application interfaces 604*f* and 604*g* are part of a plug-in of a native content viewer or editor associated with word processing interface 606. The native application can display a badge, client application interface 604*f*, when opening a content item associated with a content management system (e.g., content management system 100).

Client application interface 604*f* can provide in real-time or substantially real time information regarding accounts viewing or editing the content item, one or more options to update to the latest version of the content item, one or more options to share the content item or a collection including the content item, one or more options to provide or request for comments regarding the content item, a version history of the content item, etc. In this example, client application interface 604*f* displays an application notification interface, client application interface 604*g*, when another account, Account A, saves a latest version of the content item to the content management system.

Client application interface 604*g* can include avatar icon 608 or other identifier identifying the account saving the latest version of the synchronized content item to the content management system, update summary 610 describing the nature of the changes to the content item, and merge button 612 enabling the account associated with client application 604, Account B, to merge Account A's version and Account B's version of the content item. Additional details discussed with respect to FIG. 7 and discussed elsewhere in the present disclosure describe examples of how to automatically generate update summary 610.

Figure 6B:
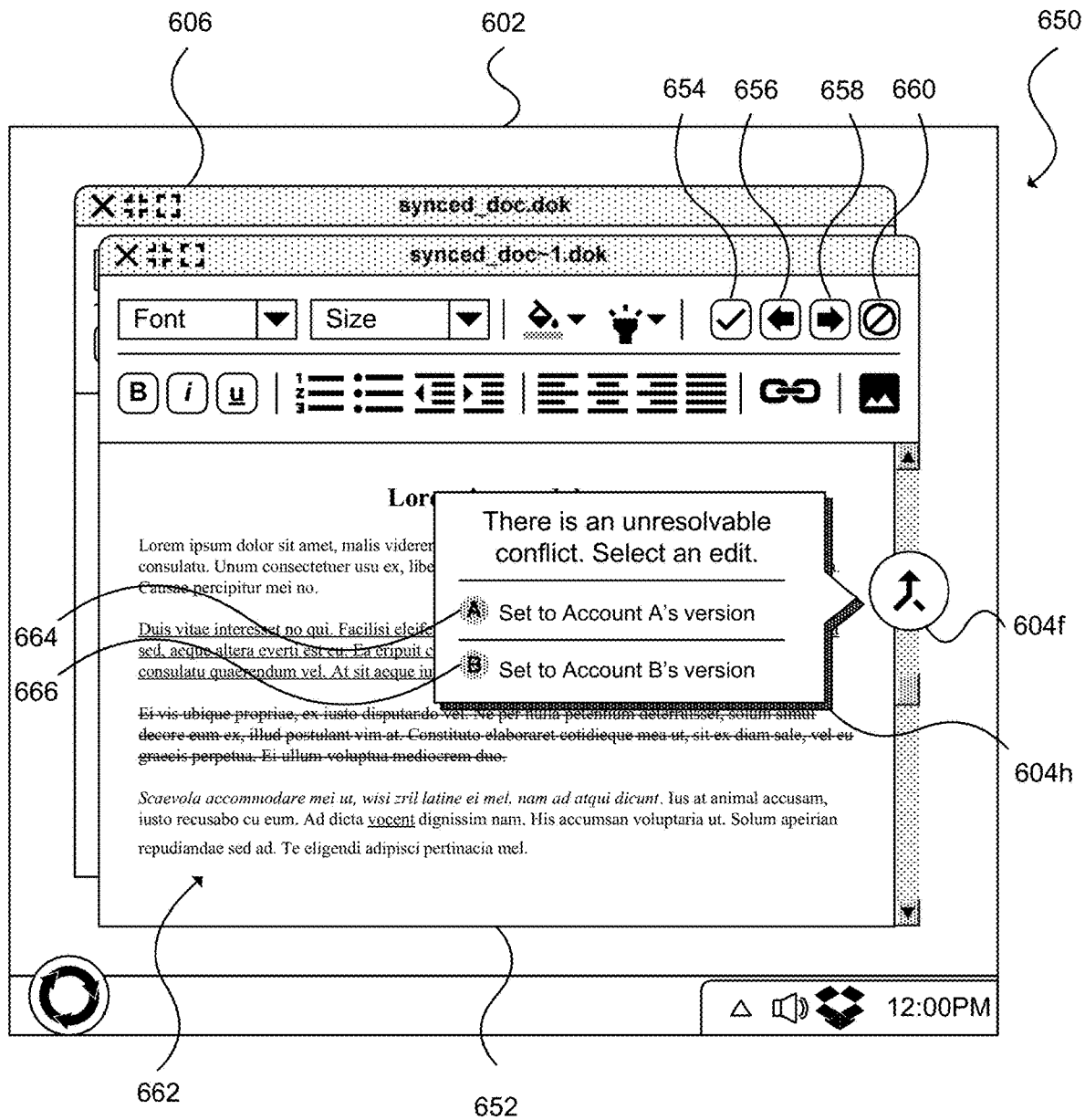

FIG. 6B shows an example of client interface 650 including desktop interface 602, client application interfaces 604*f* and 604*h* (collectively, client application 604), first word processing interface 606, and second word processing interface 652 for merging multiple versions of a synchronized content item. In this example, the badge, client application interface 604*f*, may change from an icon, button, badge, or other selectable element (e.g., a Dropbox icon) for an application, a plug-in, a function, a shortcut, etc. to a merge icon to indicate that word processing interface 652 is in a merge mode. Word processing interface 652 includes user interface elements 654, 656, 658, and 660 for natively viewing and/or editing diff 662. In particular, check icon or button 654 enables a user to accept an edit, block icon or button 660 enables the user to reject the edit, and left arrow icon or button 656 and right arrow icon or button 658 enables the user to respectively skip back to a previous edit or skip forward to a next edit. As discussed, a client application can include a non-native content viewer or editor for viewing and/or editing a diff (e.g., client application interface 504*d*). In addition or alternatively, the client application can integrate with a native content viewer or editor (e.g., word processing interface 652) to provide additional features not supported by the native application, such as facilitating merging of multiple versions of a synchronized content item.

In this example, there are multiple merge conflicts that client application 604 cannot resolve. In such situations, client application 604 can display a conflict resolution interface, client application interface 604*h*, requesting for selection of one of two or more options, such as conflict resolution option 664 and conflict resolution option 666, for resolving the merge conflict. Of course, a user may also manually resolve the merge conflict by editing diff 662 directly within word processing interface 652.

FIG. 7 shows an example of a process 700 for generating a descriptive summary of the differences between and among multiple versions of a content item. A person of ordinary skill in the art will understand that, for any process, method, sequence, etc. discussed herein, there can be additional, fewer, or alternative steps performed in similar or alternative orders, or in parallel, within the scope of various implementations of the present technology unless otherwise stated. A content management system (e.g., content management system 100), a service of the content management system (e.g., synchronization service 150 or other content management system service), a client application (e.g., client application 202), a component of the client application (e.g., diff engine 222), a combination of these systems, etc. (collectively, the content management system) can perform process 700.

In some implementations of the present technology, process 700 adopts a multi-label classification framework for determining a summary that best fits the differences. Process 700 may begin at step 705 with determining the features corresponding to the differences. For example, one feature could be an m×n matrix quantifying the respective number of edit types m within each segment of segmentation types n. Edit types can include insertions, deletions, modifications (e.g., insertions or deletions that do not span a minimum threshold for an insertion and deletion), moves (e.g., a portion of a content item of at least a minimum size moved from one location of the content item no more than a maximum distance from another location of the content item), formatting changes, etc. Segmentation types can include sentences, paragraphs, numeric sections, named sections, pages, chapters, etc.

Other text-based features can include total and/or per edit differences in the number of capital letters, differences in the number of digits, differences in the number of non-alphanumeric characters, differences in the number of whitespace characters, differences in the number of characters, differences in the number of words, differences in the number of repeated characters, differences in the number of repeated words; ratios between and/or among the number of different characters in each revised paragraph, the number of different characters of each version, the number of different words in each revised paragraph, the number of different words in each version, the number of different characters in each edited paragraph, etc.

Other features can include those based on metadata, such as whether each version identifies the same editor, whether the editor group associated with each version is the same, a number of comments for each version, a time difference between each version, the total number of edits, a distance between the geographic locations associated with each version, a distance between the network locations associated with each version, whether the host type associated with each version is the same, whether the client application associated with each version is the same, the difference in sizes between each version.

Still other features can include those based on a specific type of the content item, such as markup features for webpage or XML documents, programming language features for source code, contract features, annual report features, computer-aided design (CAD) drawing features, film and television script features, etc.

Process 700 can continue at step 710, storing the various features as part of the metadata of the content item. Additional details discussed with respect to FIG. 8 and elsewhere in the present disclosure describe examples of how to use this metadata to enhance version history management. At step 715, the content management system can apply the features determined at step 705 to one or more machine learning or other pattern recognition algorithms to determine the most suitable summary of the differences between and among the versions. Machine-learning and pattern recognition algorithms can include decision trees, random forests, rules-based classifiers, support vector machine (SVM) classifiers, neural network classifiers, nearest neighbor classifiers, etc.

Decision trees use a hierarchical division of the underlying data and different text features. The hierarchical division of the data creates class partitions skewed in terms of their class distribution. For a given set of differences between multiple versions of a content item, the partition that it is most likely to belong to is that set's classification.

Random forests rely on a combination of decision trees in which each tree depends on the values of a random vector sampled independently and with the same distribution for all trees in the forest. Implementers can train a random forest for a number of trees T by sampling n cases of the training data at random with replacement to create a subset of the training data. At each node, the classifier selects a number m of the features at random from the set of all features, and ultimately selects the feature that provides the best split to do a binary split on that node. At the next node, the classifier selects another number m of the features at random and repeats the process.

Rules-based classifiers determine patterns (e.g., regular expressions) that are most likely related to the different classes. These types of classifiers define a set of rules in which the left-hand side corresponds to a pattern, and the right-hand side corresponds to a class label. The rules determine the classification.

SVM classifiers attempt to partition the underlying data using linear or non-linear delineations between the different classes. The premise of these classifiers is to determine the optimal boundaries between the different classes and use these boundaries for the purposes of classification.

Neural network classifiers utilize an interconnected group of functions or classifiers that process information using a connectionist approach. Neural networks change their structure during training, such as by merging overlapping detections within one network and training an arbitration network to combine the results from different networks.

Nearest neighbor classifiers determine the k-nearest neighbors in the training data to a specific set of differences between versions of a content item, and the majority class from these k neighbors determine the classification.

At step 720, the content management system can determine a semantic expression or descriptive summary associated with the classification determined at step 715. This can include extracting numeric quantities (e.g., n number of content segments added/deleted/edited/etc.), content segment headings or numerals, account identifiers, etc. as appropriate. This can also include truncating the semantic expression or descriptive summary if there are size limitations where the content management system will present the expression.

In some implementations, ascertaining the semantic expression or descriptive summary can include determining the qualitative nature of edits or updates to a content item. For example, a user may add 4 pages to a particular section of a content item and add or edit one to two sentences of 3 other sections of the content item. The content management system may determine that the edits to the section with 4 new pages as the most significant edits to the latest version of the content item and classify the user's edits as directed toward that section (e.g., "Jongmin revised Section III of 'synced_doc.dok'"). On the other hand, the content management system may determine that the user has added 4 pages to the foreword or some other less critical portion of a biography and that the user has revised 3 critical sections making up the biography subject's formative years. In this situation, the content management system may classify the user's edits as directed toward this portion of the biography (e.g., "Daniel revised 'The Early Years' of 'The Life and Times of Yuyang Guo'"). As another example, the content management system may determine that the user added 4 pages to a references section of a content item and added or edited citations to 3 other sections of the content item. In this situation, the content management system may determine that the user has fact checked the content item and classify the user's edits as such (e.g., "Kim has fact-checked 'synced_doc.dok'"). Other qualitative edit or update categorizations are also possible, such as determining that edits or updates are primarily proofreading edits (e.g., corrections for misspellings, grammar, or other typographic errors that do not alter the meaning of the original text), copy edits (e.g., corrections to conform to a style guide in addition to proofreading edits), substantive edits (e.g., additions or deletions that alter the meaning of the original text), etc.

Determining the semantic expression or descriptive summary can also include characterizing the edits or updates as major, minor, and/or possessing some other general quality. Co-pending U.S. patent application Ser. No. 15/280,442, filed on Sep. 29, 2016, entitled, "Document Differences Analysis and Presentation," and incorporated by reference by the present disclosure, discusses systems and approaches for determining whether edits or updates to a content item are major, minor, and/or including another quality. In some implementations, the content management system may combine the various classifications or categorizations discussed in the present disclosure to determine the semantic expression or descriptive summary of edits or updates to a content item (e.g., "Jongmin made major revisions to Section III of 'synced_doc.dok'" or "Daniel made major revisions to 'The Early Years' of 'The Life and Times of Yuyang Guo.'") In other implementations, the content management system may apply one classification or categorization alone (e.g., "Kim made minor edits to 'synced_doc.dok'").

Finally, the content management system can present these expressions at step 725, such as in operating system notification interfaces (e.g., client application interface 404c), application notification interfaces (e.g., client application interface 604g), initial comments for a version, version history interfaces (e.g., client application interface 804i), etc.

In some implementations, the content management system can continue improving the training data for the machine learning model based on user feedback. For example, the content management system can support automated commenting as discussed elsewhere in the present disclosure. Each time an account saves a latest version of a synchronized content item, the content management system can present a descriptive update summary determined at step 720 as a default value for an initial comment of the latest version. If the account makes no changes to the initial comment, the content management system can use the features associated with this latest version as another affirmative training sample. Conversely, if the account makes substantial changes, the content management system can use the features as a negative training sample.

FIG. 8 shows an example of client interface 800 including web browser interface 802 and client application interface 804i (associated with client application 804) for presenting a version history of a synchronized content item, "synced_doc.dok." Web browser interface 802 can communicate with a web server of a content management system (e.g., content management system 100) associated with a network address, "https://www.dropbox.com/history/synced_doc.dok," to fetch a webpage comprising markup language (e.g., hypertext markup language (HTML), extensible markup language (XML), etc.) and linking to text, image, video, and other data, render the markup language and linked data, and display client application interface 804i. In this example, a user associated with an account of the content management system, Account B, has previously provided credentials to the content management system to gain access to the account, and selected an option to view the version history of the content item.

Client application interface 804i includes a list of versions 806 of the synchronized content item, including latest version 806a as denoted by current icon 808 and selected version 806b as denoted by its prominent display relative to and/or the graying out of the other versions. Client application interface 804i can detect a mouse over, a hover input, a tap, a voice command, or other suitable input as a selection of version 806b. Client application 804 can additionally indicate selection of version 806b by displaying diff button 810, comment button 812, and make current button 814. Selection of diff button 810 can cause client application 804 to display a client interface (e.g., client application interface 504d or word processing interface 652 for presenting the diff between versions 806a and 806b). Selection of comment button 812 can cause client application 804 to display a client interface for presenting comments associated with version 806b. Selection of make current button 814 can cause client application 804 to elevate version 806b to be the latest version of the content item.

Client application interface 804i can include other interface elements for managing the version history of a synchronized content item, such as sorting tool 816 and filtering tool 818. In this example, client application interface 804i displays versions 806 sorted by date and unfiltered. However, a user may also select one or more other sorting criteria from sorting tool 816 to sort versions 806 in ascending or descending order based on version metadata (e.g., modification date, content item name and/or other identifier, file size, etc.), metadata associated with the account uploading the version (e.g., account number and/or other identifier, geographic location associated with the account, network location associated with the account, group associated with the account, etc.), metadata associated with the client device uploading the version (e.g., host type, operating system, client application type, etc.). The user may also select from sorting tool 816 one or more criteria based on metadata regarding the diff between versions 806a and 806b, such as a total number of edits, a number of edits of one or more edit types (e.g., insertions, deletions, modifications, etc.), a number of revised content segments (e.g., sentences, paragraphs, numeric or named sections, etc.), the text-based features discussed with respect to FIG. 7 and elsewhere in the present disclosure (e.g., differences in the number of capital letters, digits, non-alphanumeric characters, etc.; ratios between and/or among the number of different paragraphs in each revised paragraph, the number of different characters in each version, the number of different words in each revised paragraph, etc.), among other criteria.

In addition or alternatively, the user can also select one or more of the same sorting criteria from filtering tool 818 to include and/or exclude versions satisfying the selected criteria. In some implementations, client application 804 can also enable a user to conduct keyword searches and/or filter versions 806 to include and/or exclude each version having or not having certain keywords within the version's content, comments, edit categorization, revised named segments, etc. For example, client application 804 may support regular expressions and/or Boolean logic for keyword searches and/or filtering criteria. As discussed, client application 804 can determine the values for the sorting and/or filtering criteria in a request to a diff engine (e.g., diff engine 222) and save these values as part of the metadata for the content item, version 806a, version 806b, a combination of these objects, etc.

As discussed, in some implementations, client application 804 can also generate a single diff between and/or among two or more specified versions of a content item.

Figure 9:
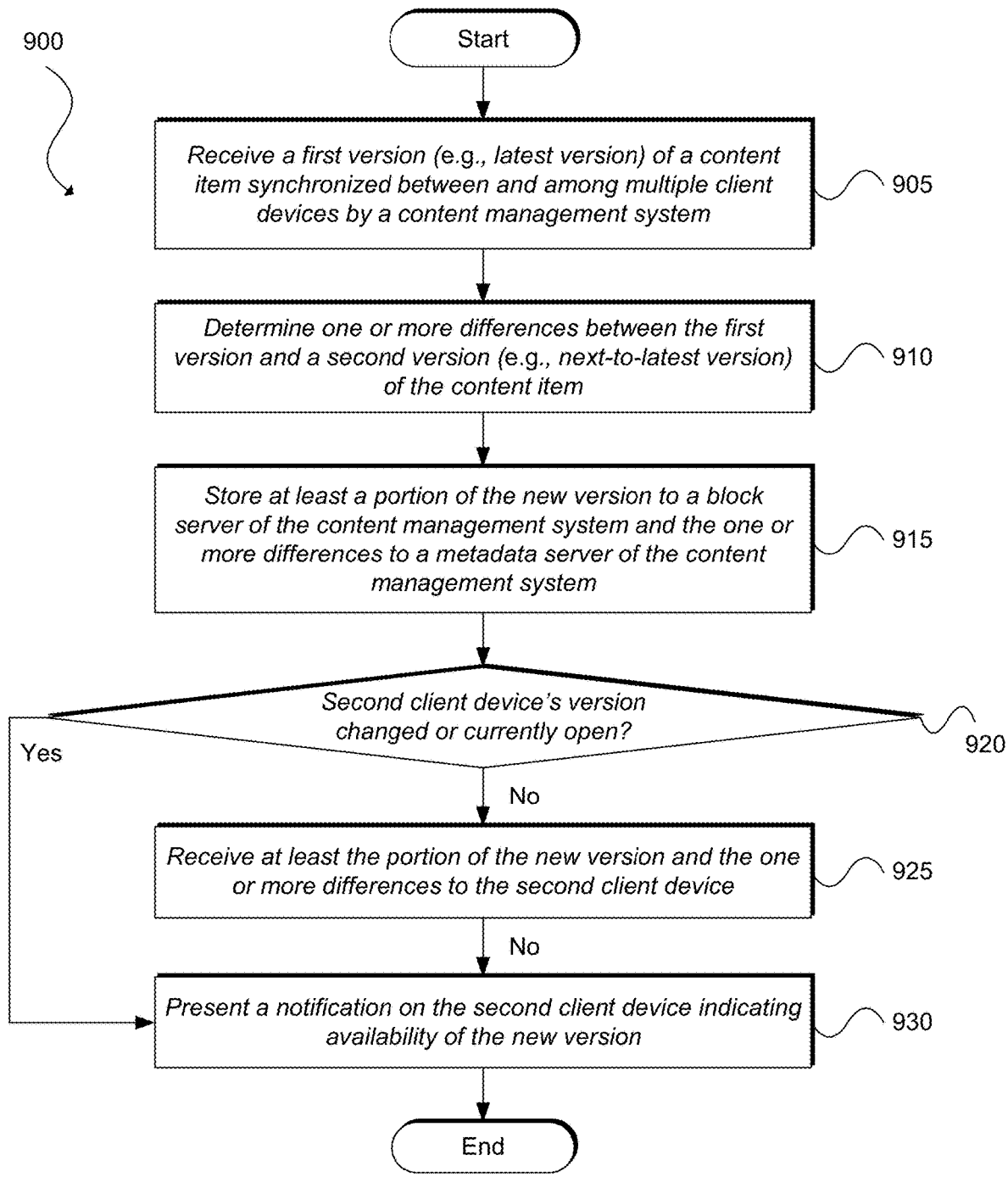
FIG. 9 shows an example of a process for managing a version history of a shared, synchronized content item.

FIG. 9 shows an example process 900 for managing a version history of a shared, synchronized content item. One skilled in the art will understand that, for any process, method, sequence, etc. discussed herein, there can be additional, fewer, or alternative steps performed in similar or alternative orders, or in parallel, within the scope of various implementations of the present technology unless otherwise stated. A content management system (e.g., content management system 100) or a component of the content management system (e.g., client application 202) (collectively, the content management system) can perform process 900.

Step 905, in which a first client application (e.g., client application 202) of the content management system receives a request to upload a first or latest version of a synchronized content item, initiates process 900. A first user having an account with the content management system owns and operates a first client device (e.g., client device 200) on which the first client application runs.

In this example, the first client application includes a diff engine (e.g., diff engine 222) that receives a request to determine one or more differences between the first or latest version and a second or next-to-last version of the synchronized content item at step 910. In some implementations, the diff engine may be a part of a native application on the first client device associated with a file type of the content item. In other implementations, the diff engine may be a service of the content management system that the first client application remotely calls to acquire the diff. The diff service may also perform additional processing to streamline synchronization and version history management of the synchronized content item, including determining: the delta of the blocks of the first version and the second version; analytical data from the diff and the metadata of the first version, the second version, and the diff; and the update summary best describing the nature of the differences between the first version and the second version as discussed with respect to FIG. 7 and elsewhere in the present disclosure. The content management system may store some of this data as part of the metadata for the synchronized content item, the latest version, the next-to-latest version, the diff, etc. Storing this data can reduce the amount of processing and other computing resources that the content management system or other client devices may otherwise incur.

At step 915, the first client application/diff service may initiate a synchronization protocol with the content management system (or vice versa) to upload the metadata and the delta blocks for storage. In some implementations, the content management may support streaming synchronization and can ping the second client device as soon as the block server (e.g., block storage 136) commits at least one delta block. At decision point 920, the second client device can check whether its version of the synchronized content item has unsaved changes and/or whether its version is open. If not, at step 925, the client device can retrieve the delta blocks and at least some of the metadata from the content management system (or from the first client device if both devices are on the same LAN and the content management system supports LAN synchronization) as soon as the content management system commits each block of the synchronized content item.

Upon the second client device receiving the delta blocks in their entirety, the second client device can generate a notification indicating that the first or latest version is available for access at step 930. The notification can also include a first interface element (e.g., review changes button 414) for real-time or substantially real-time access to the diff as discussed with respect to FIG. 4, FIG. 6B, and elsewhere in the present disclosure.

On the other hand, if the second client device determines at decision point 920 that its version of the synchronized content item has changes not synchronized with the content management system or that its version is currently open, the second client can proceed to step 930 to generate a notification indicating that its version is no longer up-to-date with the content management system and/or that the first account has updated the content management system with the first or latest version. The notification can include an interface element (e.g., merge button 612) for real-time or substantially real-time access to a merge of the first or latest version and the second client's version (i.e., the second or next-to-latest version in addition to any changes made by the second client) as discussed with respect to FIG. 6A, FIG. 6B, and elsewhere in the present disclosure.

Figure 10:
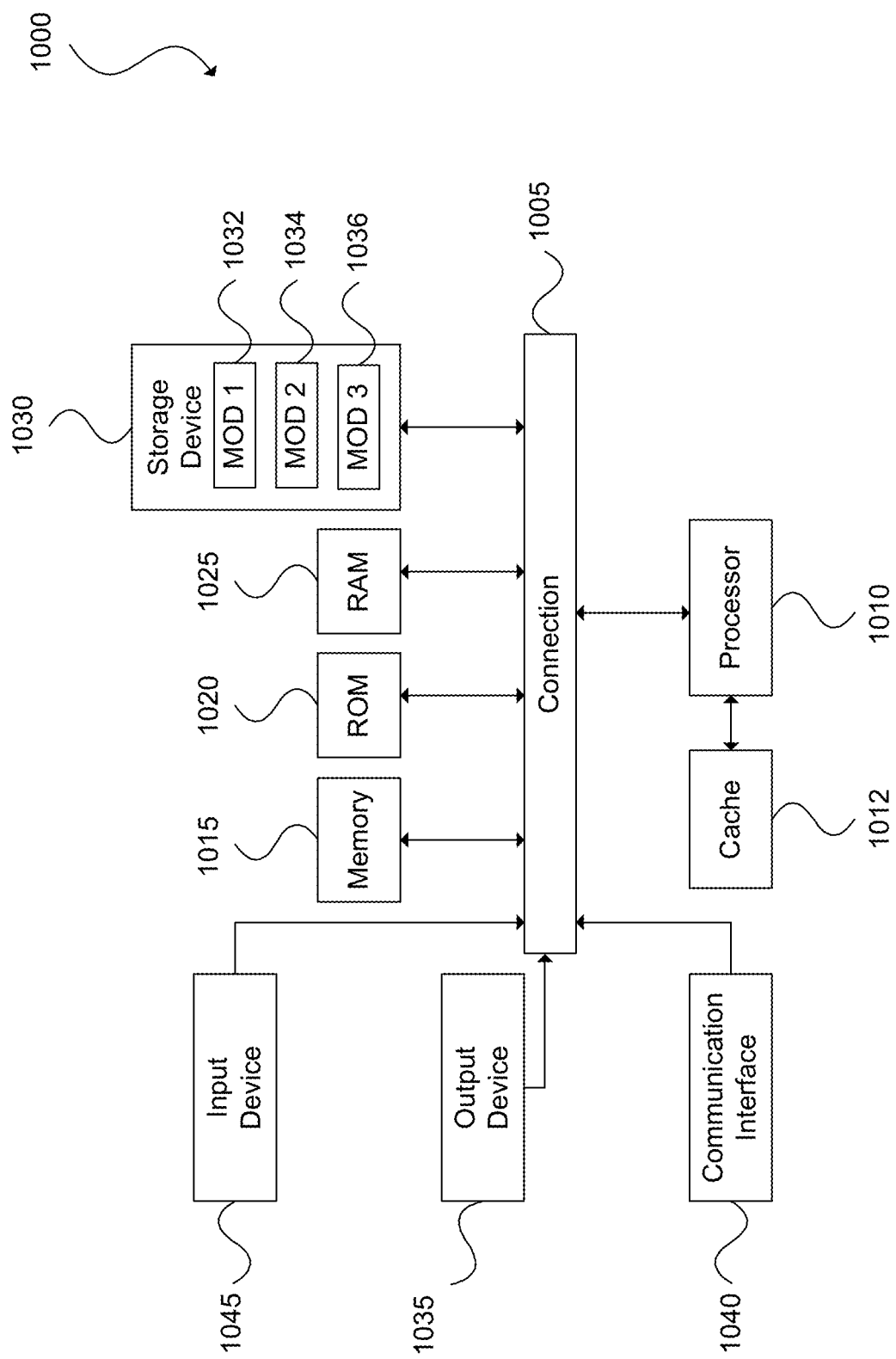
FIG. 10 shows an example of a computing system for implementing aspects of the present technology.

FIG. 10 shows an example of computing system 1000 in which the components of the system are in communication with each other using connection 1005. Connection 1005 can be a physical connection via a bus or a direct connection into processor 1010, such as in a chipset architecture. Connection 1005 can also be a virtual connection, network connection, logical connection, etc.

In some implementations, computing system 1000 is a distributed system with the functions described in the present disclosure distributed within a datacenter, multiple datacenters, a peer network, etc. In some implementations, one or more of the components of computing system 1000 represent many such devices each performing some or all of the function for which the component is described. In some implementations, the components can be physical or virtual devices.

Computing system 1000 can include at least one processing unit (CPU or processor) 1010 and connection 1005 that couples various components including memory storing firmware 1015, read only memory (ROM) 1020, and random access memory (RAM) 1025, to processor 1010. Computing system 1000 can include cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor with software instructions incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, a keyboard, a mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage user input and system output. There is no restriction on operating on any particular hardware arrangement and therefore implementations of the present technology can easily substitute the basic features here for improved hardware or firmware arrangements as developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memory (RAM), read only memory (ROM), and/or some combination of these devices.

Storage device 1030 can include software services, servers, services, etc., that when processor 1010 executes the code that defines such software, causes the system to perform a function. In some implementations, a hardware service that performs a particular function can include the software component stored in a computer-readable medium in connection with the necessary hardware components, such as processor 1010, connection 1005, output device 1035, etc., to carry out the function.

For clarity of explanation, in some instances the disclosure represents the present technology as individual functional blocks. One skilled in the art will understand that the individual functional blocks may include any number of devices, device components, steps, routines, etc. in a method, process, sequence, etc. embodied in software or combinations of hardware and software.

A combination of hardware and software services or services, alone or in combination with other devices, can perform or implement any of the steps, operations, functions, or processes described in this disclosure. In some implementations, a service can include software that resides in memory of a client device and/or one or more servers of a content management system and perform one or more functions when a processor executes the software associated with the service. In some implementations, a service is a program or a collection of programs that carry out a specific function. In some implementations, a service can be considered a server. The memory can be a non-transitory computer-readable medium.

In some implementations, the computer-readable storage devices, mediums, and memories can include a cable or wireless signal containing a bit stream or other suitable data. However, when mentioned, non-transitory computer-readable storage media expressly exclude media such as energy, carrier signals, electromagnetic waves, and signals per se.

Methods according to the above-described examples can be implemented using computer-executable instructions stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that for storing instructions, information used, and/or information created during methods according to described examples include magnetic or optical disks, solid state memory devices, flash memory, USB devices provided with non-volatile memory, network storage devices, etc.

Devices implementing methods according to this disclosure can include hardware, firmware, and/or software, and can take any of a variety of form factors. Typical examples of such form factors include servers, laptops, smartphones, small form factor personal computers, personal digital assistants, etc. Peripherals or add-in cards can also implement the functionality described by the present technology. By way of further example, a circuit board among different chips or different processes executing in a single device can also implement such functionality.

The instructions, media for conveying such instructions, computing resources for executing them, and other structures for supporting such computing resources are means for providing the functions described in these disclosures.

Although the disclosure uses a variety of examples and other information to explain aspects within the scope of the appended claims, a skilled artisan will understand that there are no limitation of the claims based on particular features or arrangements in such examples, as one of ordinary skill would be able to use these examples to derive a wide variety of implementations. Further, and although the disclosure may describe some subject matter in language specific to examples of structural features and/or method steps, one skilled in the art will understood that the subject matter defined in the appended claims is not necessarily limited to these described features or acts. For example, such functionality can be distributed differently or performed in components other than those identified herein. Rather, the described features and steps are examples of components of systems and methods within the scope of the appended claims.

What is claimed is:

1. A computer-implemented method, comprising:
   receiving a communication from a content management system that a second version of a content item at the content management system has replaced a first version of the content item;
   after receiving the communication, presenting, by a client application on a client device, a notification including:
      information indicating that the second version has replaced the first version in the content management system, and
      a selectable interface element for requesting presentation of one or more differences between content of the first version and the second version of the content item, at least a portion of the second version of the content item being stored in a block server of the content management system and the one or more differences between the content of the first version and the second version of the content item being stored as a first set of metadata in a metadata server of the content management system, wherein the portion of the second version is a modified portion of the first version;
   determining one or more features from the one or more differences;
   determining one or more classifications for the one or more differences by applying one or more machine learning algorithms to the one or more features;
   presenting, in response to receiving a selection of the selectable interface element for requesting the presentation of the one or more differences between the content of the first version and the second version of the content item, a preview of a comparison of the first version and the second version in a non-native application content viewer interface associated with the notification, the comparison identifying the one or more differences between the content of the first version and the second version that are stored in the metadata server of the content management system; and
   displaying at least some of the one or more differences according to the one or more classifications in the non-native application content viewer interface.

2. The computer-implemented method of claim 1, further comprising:
   receiving a total quantity of at least one edit type among the one or more differences; and
   displaying the total quantity within the notification.

3. The computer-implemented method of claim 1, wherein the non-native application content viewer interface is not a default application for opening a file type associated with the content item.

4. The computer-implemented method of claim 1, further comprising:
   determining that the client device has one or more unsynchronized changes to the second version,
   wherein the selectable interface element further requests a merge of the first version and the one or more unsynchronized changes.

5. The computer-implemented method of claim 4, further comprising:
   retaining the second version and the one or more unsynchronized changes in memory;

generating a new version of the content item by merging the first version and the one or more unsynchronized changes; and presenting the new version of the content item including one or more tracked changes associated with at least one of the one or more differences or the one or more unsynchronized changes.

6. The computer-implemented method of claim 1, further comprising:

determining a summary for the one or more differences based on the one or more classifications.

7. The computer-implemented method of claim 1, further comprising:

determining an m×n matrix quantifying a respective number of edit types m within each segment of segmentation types n as one of the one or more features, the edit types m including insertions or deletions that do not span a minimum threshold for the insertions and the deletions, the segmentation types n including at least one of sentences, paragraphs, and numeric sections.

8. The computer-implemented method of claim 6, further comprising:

displaying the summary within the notification.

9. The computer-implemented method of claim 6, further comprising:

presenting the summary as a default comment for the first version.

10. The computer-implemented method of claim 1, further comprising:

presenting a version history of the content item that includes at least the first set of metadata associated with the first version and a second set of metadata associated with the second version;

receiving at least one of a sorting criterion or a filtering criterion; and sorting or filtering the version history based on at least one of the sorting criterion or the filtering criterion, wherein at least one of the sorting criterion or the filtering criterion is based on a metadata value associated with the one or more differences.

11. The computer-implemented method of claim 1, further comprising:

receiving a request for presentation of one or more second differences between the first version and a third version of the content item;

determining the one or more second differences; and presenting the one or more second differences along with and differentiated from the one or more differences between the first version and the second version.

12. The computer-implemented method of claim 1, comprising:

acquiring, from the content management system by the client application, the one or more differences between the first version and the second version of the content item, wherein the one or more differences are included in the metadata associated with the content item.

13. The computer-implemented method of claim 12, wherein the one or more differences are received by the client application in a separate communication from the receipt of the second version of the content item.

14. The computer-implemented method of claim 1, wherein the notification is presented from a notification tray.

15. The computer-implemented method of claim 1, wherein the selectable interface element enables a subsequent selection for requesting presentation of one or more additional differences between the content of the second version and a third version of the content item, the one or more additional differences stored as a second set of metadata in the metadata server and at least a portion of the third version stored in the block server, wherein the portion of the third version is a modified portion of the second version.

16. A computing device, comprising:

one or more processors; and memory including instructions that, when executed by the one or more processors, cause the computing device to:

receive a communication from a content management system including information regarding one or more differences between content of a second version of a content item and content of a first version of the content item;

after receipt of the communication, present, by a client application, a notification associated with the one or more differences at a client application interface, wherein the notification includes a selectable interface element for requesting presentation of information regarding the one or more differences between the content of the first version and the second version of the content item, a portion of the second version of the content item being stored in a block server of the content management system and the one or more differences between the content of the first version and the second version of the content item being stored as metadata in a metadata server of the content management system, wherein the portion of the second version is a modified portion of the first version;

determine one or more features from the one or more differences;

determine one or more classifications for the one or more differences by applying one or more machine learning algorithms to the one or more features; and present, in the client application and in response to the receipt of a selection of the selectable interface element for requesting the presentation of the information associated with the one or more differences between the content of the first version and the second version of the content item, the information regarding the one or more differences between the content of the first version and the second version that are stored in the metadata server of the content management system, wherein the information comprises the one or more classifications for the one or more differences.

17. The computing device of claim 16, wherein the instructions, when executed, further cause the computing device to:

determine that the computing device has one or more unsynchronized changes to the second version, wherein the selectable interface element further requests for merging the first version and the one or more unsynchronized changes.

18. The computing device of claim 17, wherein the instructions, when executed, further cause the computing device to:

retain the second version and the one or more unsynchronized changes in memory;

generate a new content item by merging the first version and the one or more unsynchronized changes; and present the new content item including one or more tracked changes associated with at least one of the one or more differences or the one or more unsynchronized changes.

19. The computing device of claim 18, wherein the instructions, when executed, further cause the computing device to:
  determine that the new content item includes at least one conflict that is not automatically resolvable; and
  present an interface including a plurality of options for resolving the at least one conflict.

20. The computing device of claim 16, wherein the client application interface is part of a plug-in of a native content viewer for the content item.

21. A computer-implemented method, comprising:
  receiving at a content management system, a first version of a content item from a client application on a first client device, the client application associated with the content management system;
  receiving, at the content management system, delta blocks representative of changes made at the client application, wherein the delta blocks include data conveying a nature of one or more differences between content of the first version and a second version of the content item;
  determining, by the content management system, that a second client application on a second client device is authorized to receive the first version;
  determining, by the content management system based on the received delta blocks, that the second client application on the second client device includes one or more unsynchronized changes to the second version of the content item, the second version being a previously synchronized version of the content item;
  causing the second client device to present a notification associated with the one or more differences between the content of the first version and a second version of the content item at a client application interface part of a plug-in of a native content viewer for the content item, the notification including a selectable interface element for requesting a comparison of the content of the first version and the one or more unsynchronized changes, a portion of the second version of the content item being stored in a block server of the content management system and the comparison of the content of the first version and the one or more unsynchronized changes being stored as metadata in a metadata server of the content management system, wherein the portion of the second version is a modified portion of the first version;
  determining one or more features from the one or more differences;
  determining one or more classifications for the one or more differences by applying one or more machine learning algorithms to the one or more features; and
  causing the second client device to present, in response to a selection of the selectable interface element, the comparison of the content of the first version and the one or more unsynchronized changes that are stored in the metadata server of the content management system at the native content viewer for the content item, wherein at least a part of the comparison comprises the one or more classifications for the one or more differences representative of at least some of the changes made at the client application.

22. The computer-implemented method of claim 21, further comprising:
  causing the second client device to retain the second version and the one or more unsynchronized changes in memory;
  causing the second client device to generate a new content item by merging the first version and the one or more unsynchronized changes; and
  causing the second client device to present the new content item and one or more tracked changes.

23. The computer-implemented method of claim 21, further comprising:
  receiving a request for presenting a version history of the content item that includes at least first metadata associated with the first version and second metadata associated with the second version;
  receiving at least one of a sorting criterion or a filtering criterion; and
  sorting or filtering the version history based on at least one of the sorting criterion or the filtering criterion.

24. The computer-implemented method of claim 21, further comprising:
  storing at least a portion of the one or more differences as stand-alone content items, wherein the at least the portion of the one or more differences are a major version change of the content item, the major version change of the content item representing one of the one or more classifications.

* * * * *